US006947228B2

(12) United States Patent
Kato

(10) Patent No.: US 6,947,228 B2
(45) Date of Patent: Sep. 20, 2005

(54) OBJECTIVE LENS DRIVING DEVICE, OPTICAL PICKUP DEVICE, AND OPTICAL INFORMATION RECORDING AND/OR REPRODUCTION DEVICE

(75) Inventor: Norihiro Kato, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/923,849

(22) Filed: Aug. 24, 2004

(65) Prior Publication Data

US 2005/0024750 A1 Feb. 3, 2005

Related U.S. Application Data

(63) Continuation of application No. 10/362,074, filed as application No. PCT/JP02/06082 on Jun. 18, 2002, now Pat. No. 6,859,325.

(30) Foreign Application Priority Data

Jun. 20, 2001 (JP) ..................................... P2001-186973
Nov. 20, 2001 (JP) ..................................... P2001-355116
Dec. 27, 2001 (JP) ..................................... P2001-397479

(51) Int. Cl.$^7$ ............................................. G02B 27/10
(52) U.S. Cl. ........................ 359/813; 359/814; 359/823; 359/824
(58) Field of Search .............................. 359/813–814, 359/822–824, 618; 369/44.15, 44.16

(56) References Cited

U.S. PATENT DOCUMENTS 5,949,590 A * 9/1999 Hong ........................ 359/814
6,341,104 B1 * 1/2002 Yamaguchi et al. ..... 369/44.15
6,344,936 B1 * 2/2002 Santo et al. ................. 359/824

FOREIGN PATENT DOCUMENTS

| JP | 8-194963 | 7/1996 |
| JP | 11-259883 | 9/1999 |
| JP | 2001-298856 | 10/2000 |
| JP | 2001-28137 | 1/2001 |
| JP | 2001-118266 | 4/2001 |

* cited by examiner

Primary Examiner—Hung Xuan Dang
Assistant Examiner—Joseph Martinez
(74) Attorney, Agent, or Firm—Rader, Fishman & Grauer, PLLC; Ronald P. Kananen

(57) ABSTRACT

This invention relates to an objective lens driving device which moves an objective lens; an optical pickup device, comprising this objective lens driving device, which condenses a light beam onto the information recording surface of an optical disc; and an optical information recording and/or reproduction device, comprising this optical pickup device, which drives in rotation an optical disc and moves the optical pickup device to record and/or reproduce information signals onto or from the information recording surface. Two printed coil boards, with a first printed coil with a first shape formed on at least one face and a second printed coil with a second shape formed on the other face, are provided in parallel in an objective lens driving device of this invention, and a moveable portion on which an objective lens is provided is connected with the two printed coil boards; also, a magnet is positioned between the two printed coil boards provided in parallel. A driving current is supplied to each of the first and second printed coils to drive the objective lens in the vertical and/or lateral directions. By means of the objective lens driving device of this invention, twice the propelling force is generated by the two printed coil boards positioned on either side of the magnet, so that driving control of the objective lens can be performed satisfactorily using a simple construction.

10 Claims, 19 Drawing Sheets

US 6,947,228 B2

OBJECTIVE LENS DRIVING DEVICE, OPTICAL PICKUP DEVICE, AND OPTICAL INFORMATION RECORDING AND/OR REPRODUCTION DEVICE

The present application is a Continuation Application of patent application Ser. No. 10/362,074, filed on Sep. 5, 2003, now U.S. Pat. No. 6,859,325, which is a 371 application of PCT/JP02/06082 filed on Jun. 18, 2002, the entire contents being incorporated by reference.

TECHNICAL FIELD

This invention relates to an objective lens driving device capable of moving an objective lens in a desired direction; an optical pickup device comprising this objective lens driving device, and capable of condensing a light beam on the information recording portion of an optical disc and of receiving the return light beam; and an optical information recording and/or reproduction device, comprising this optical pickup device, which rotates an optical disc and moves the optical pickup device to irradiate the information recording portion with a light beam to perform recording and/or reproduction of information.

BACKGROUND ART

In the prior art, in general, an optical information recording and reproduction device comprises a disc rotation mechanism to drive rotation of an optical disc at a prescribed speed; an objective lens driving device, having an objective lens which condenses a light beam on the information recording portion of the optical disc; a slide base on which the objective lens driving device is mounted; and a pickup movement device which moves the slide base along the information recording portion of the optical disc.

As conventional objective lens driving devices used in such optical information recording and reproduction devices, for example, devices such as that described in Japanese Patent Laid-open No. 63-177323 are known. This conventional objective lens driving device has a magnetic circuit portion having a magnet and yoke, and an electromagnetic coil; the electromagnetic coil is positioned within the magnetic flux generated by the magnetic circuit portion. By passing a current through this electromagnetic coil, an electromagnetic force is generated due to the magnetic force of the magnet. By fixing either the electromagnetic coil or the magnetic circuit portion to the objective lens assembly, the objective lens can be driven.

FIG. 22 is used as FIG. 1 in the above-mentioned Japanese Patent Laid-open No. 63-177323, and is a drawing showing the yoke and frame used in the objective lens driving device. In FIG. 22, symbol 1 denotes a frame formed from magnetic material. The frame 1 comprises a plate in which is provided an aperture 2 in the substantial center; at two locations corresponding to peripheral edges of this aperture 2 are provided, by raising upward the inner-edge portions, inside yokes 3a, 3b. Outer yokes 4a, 4b are provided, by raising upward the outer-edge portions of the frame at two locations, so as to oppose the inside yokes 3a, 3b.

Magnets 5a, 5b are provided integrally, bonded using adhesive to the faces of these outer yokes 4a, 4b facing the inner yokes 3a, 3b. A gap of prescribed size is provided between each of the magnets 5a, 5b and the inside yokes 3a, 3b. In these gaps are inserted a portion of a pair of coil members installed on a moveable member supporting the objective lens, not shown, such that the magnets 5a, 5b do not make contact with the respective inside yokes 3a, 3b.

The pair of coil members comprises a pair of focusing coils mounted so as to surround the inside yokes 3a, 3b, and a tracking coil fixed on the sides of the magnets 5a, 5b of the focusing coils. The pair of coil members are mounted on the moveable member, and the moveable member is movably supported by the frame 1 via a support mechanism. A pair of support pins 6a, 6b are provided in the frame 1 to support the support mechanism.

However, in a conventional objective lens driving device such as this, a pair of inside and outside yokes 3a, 3b and 4a, 4b are provided in opposition on the frame 1 of magnetic material, and magnets 5a, 5b are fixed and supported by the outside yokes 4a, 4b, while at the same time, coil members are mounted so as to surround the inside yokes 3a, 3b in opposition to the magnets 5a, 5b, so that the following problem arises.

That is, because a pair of inside and outside yokes 3a, 3b and 4a, 4b is required on the frame 1, the construction of the frame 1 is complex and machining properties are poor. Moreover, because the positioning of the inside yokes 3a, 3b and outside yokes 4a, 4b must be performed with high precision, assembly is difficult, and results in increased costs.

DISCLOSURE OF THE INVENTION

In light of these points, in the present invention, an objective lens driving device, optical pickup device, and optical information recording and/or reproduction device are proposed, which enable reduction of the number of parts through a simplified construction and improvement of productivity of parts used, as well as facilitating assembly, thereby contributing to reduction of overall device costs.

In order to solve the above-described problems and attain the above object, an objective lens driving device of this application has a configuration in which two printed coil boards are provided in parallel, with a first printed coil with a first shape formed on at least the face of one side and a second printed coil with a second shape formed on the face of the other side, with a moveable portion on which the objective lens is provided, connected with the two printed coil boards, and with a magnet positioned between the two printed coil boards provided in parallel; and is characterized in that a driving current is supplied to each of the first and second printed coils to drive the objective lens in the vertical and/or lateral directions.

Also, a pickup device of this application has a configuration in which two printed coil boards provided in parallel with a first printed coil having a first shape are formed on at least the face of one side and a second printed coil with a second shape formed on the face of the other side, with a moveable portion on which the objective lens is provided, connected with the two printed coil boards, and with a magnet positioned between the two printed coil boards provided in parallel; and is characterized in that at least tracking and focusing error signals are detected from a light beam transmitted through the objective lens, driving currents are supplied to the first and second printed coils based on the error signals, and controlled driving of the objective lens in the tracking direction and/or focusing direction is performed.

Further, an optical information recording and/or reproduction device of this application comprises a disc rotation device which drives the rotation of an optical disc; an objective lens driving device which uses an objective lens, provided on a moveable portion driven by a coil member thereon through the action of the magnetic force of a magnet on the coil member, to condense a light beam on the information recording portion of an optical disc; a slide base on which is mounted the objective lens driving device and which is formed from non-magnetic material; and a pickup movement device which moves the slide base in the radial direction along the information recording portion of the optical disc; and is characterized in that a magnet is directly fixed onto the slide base. By means of the above-described configuration, in an objective lens driving device of this application, double the propulsive force occurs through the two printed coil boards placed on both sides of the magnet, so that driving control of the objective lens can be performed satisfactorily using a simple construction.

In an optical pickup device of this application, the construction of the overall device can be simplified and the number of parts reduced, assembly can be facilitated, and the precision of the positioning of parts can be increased.

Further, in an optical information recording and/or reproduction device of this application, the stable fixation of various electronic parts and electrical equipment can be secured, mounting procedures can be simplified and devices reduced in size, and the number of parts can be decreased.

BRIEF DESCRIPTION OF THE DRAWINGS

FIG. 9 shows the first embodiment of the printed coil of a printed coil board of the first embodiment of an optical pickup device of this invention.

FIG. 12 compares and explains the force directions (F), magnetic flux (B) and electric current directions (I) based on new and old coil members.

FIG. 13 shows a second embodiment of the printed coil of a printed coil board in the first embodiment of an optical pickup device of this invention.

BEST MODE FOR CARRYING OUT THE INVENTION

Figure 1:
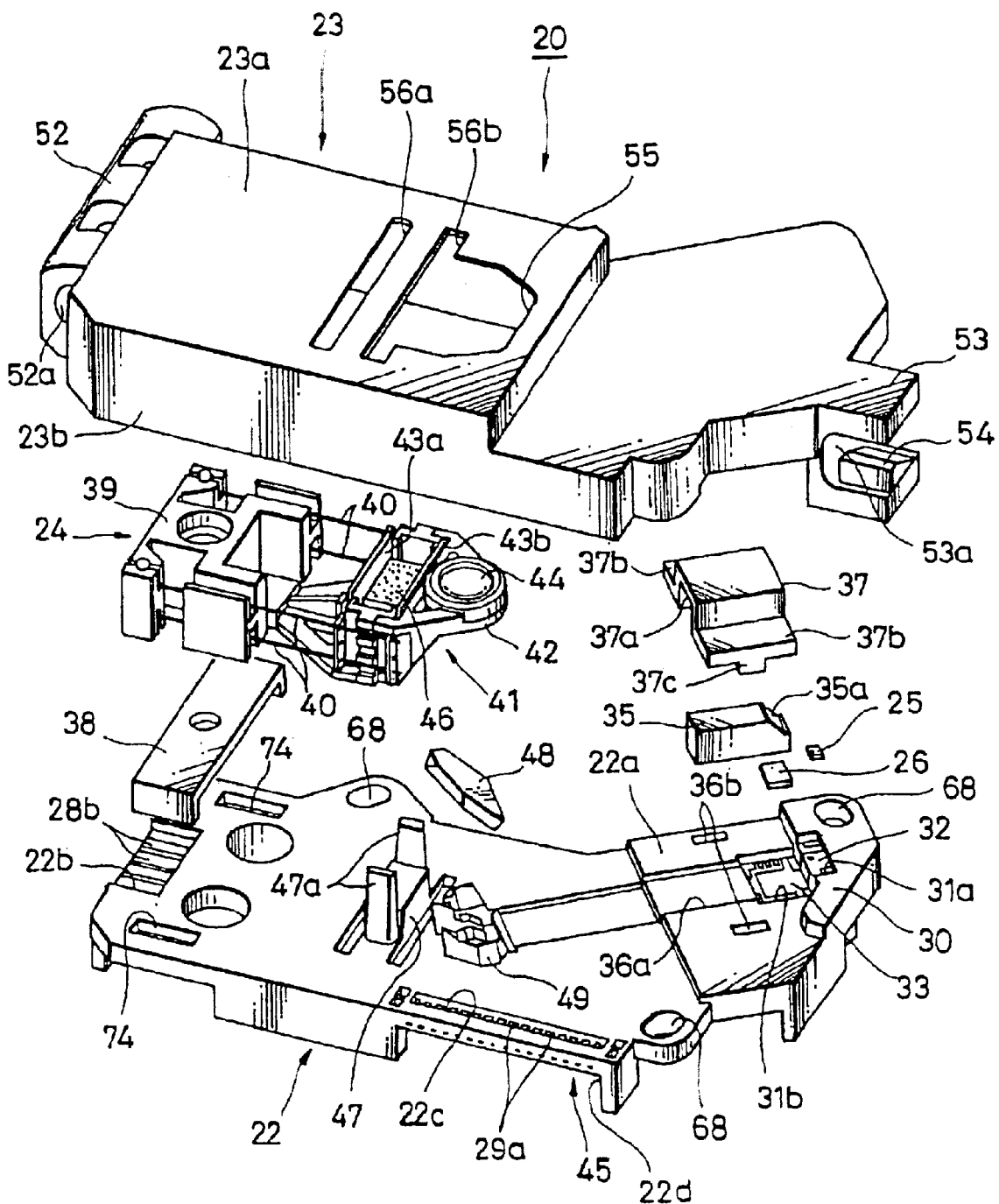
FIG. 1 is a perspective view showing in exploded form a first embodiment of an optical pickup device of this invention.

Below, aspects of this invention are explained, referring to the attached drawings. As shown in FIGS. 1 through 8, the optical pickup device 20 shown as a first embodiment in a preferred aspect of this invention comprises a slide base 21, in turn comprising a base member 22 and cover member 23; a two-axis actuator 24, illustrating one specific example of an objective lens driving device, and mounted on base member 22; a laser light source 25 which emits a light beam for recording and/or reproduction of information signals; and a photodetector 26 which receives a returning light beam reflected from the information recording portion (information recording surface) of the optical disc after emission from the laser light source 25.

Figure 2:
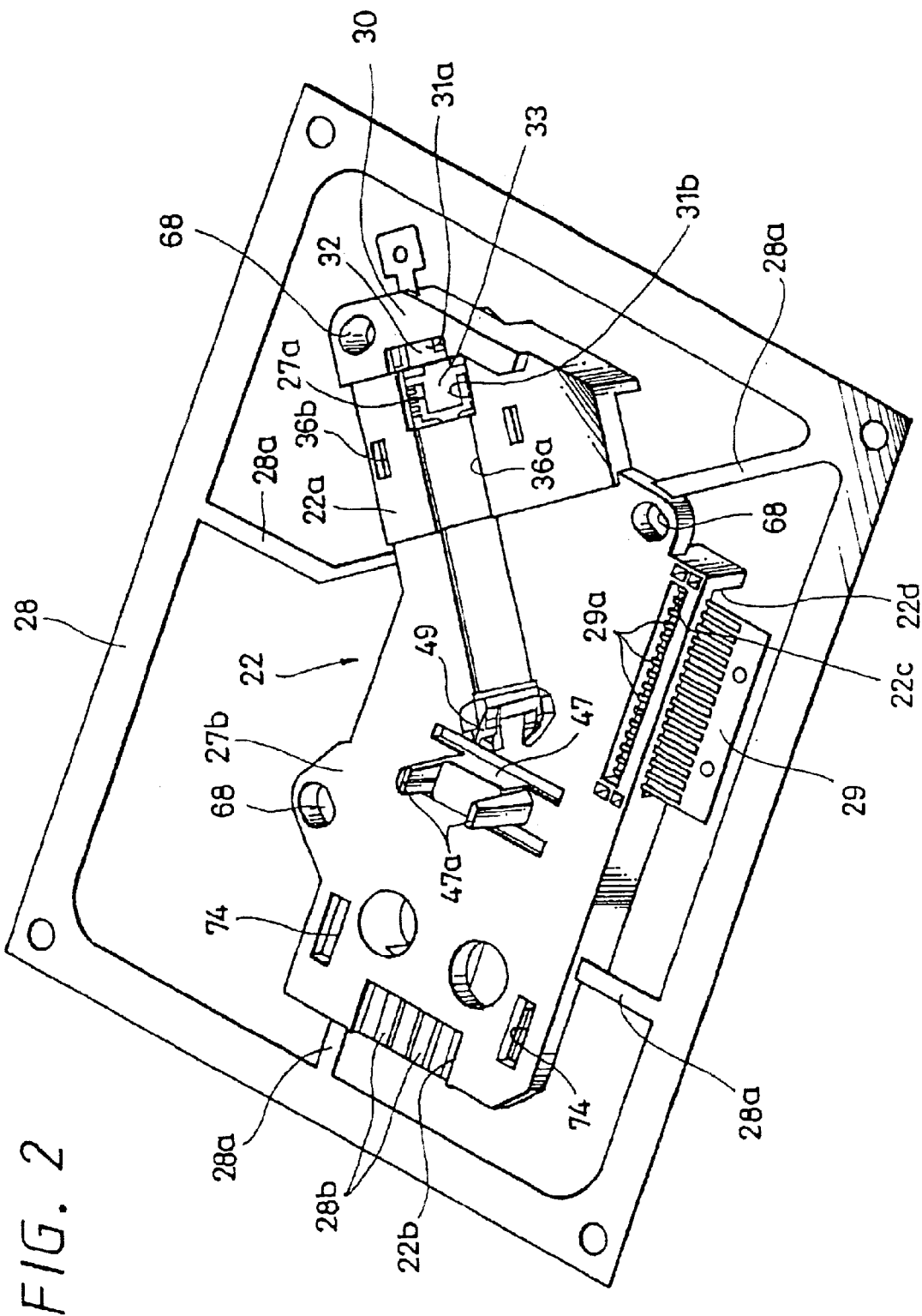
FIG. 2 is a perspective view used to explain the process of manufacture of the slide base of the first embodiment of an optical pickup device of this invention.

As shown in FIGS. 1 and 2, the base member 22 of the slide base 21 has a mounting portion 22a the plane shape of which is substantially rectangular, and which protrudes in an oblique direction at one corner portion. This base member 22 is formed integrally from a circuit core 27a forming a portion of an electrical circuit formed in the shape of circuit wiring by a conductive metal plate (for example, a copper plate), and from an outer foundation 27b formed from insulating material, which exposes the necessary portion of the circuit core 27a and covers the other portions.

As the material of the outer foundation 27b, for example, a nonmagnetic resin material (for example, a liquid crystal polymer) is used. However, the material of the outer foundation 27b is not limited to resin material, and a metal material which is not magnetic may be used, as well as a ceramic material or similar.

This base member 22 is manufactured by taking the circuit core 27a as a skeleton and adding on the outer foundation 27b. For example, after using the circuit core 27a as an insert which is set in a die, the material of the outer foundation 27b is packed into the vacant space in the die. Thus, a base member 22 in which the outer foundation 27b is bonded with the circuit core 27a can be formed integrally by injection molding.

At this time, the circuit core 27a is linked to an outer frame 28 by a plurality of support pieces 28a. As shown in FIG. 2, the outer frame 28 forms a rectangular framework, and plays the role of supporting the circuit core 27a via the plurality of support pieces 28a during molding. The circuit core 27a is connected to an auxiliary frame 29 via a plurality of terminal pieces 29a which become terminals for connection to external wires. This outer frame 28, auxiliary frame 29 and plurality of support pieces 28a are unnecessary for the molded base member 22, and so are cut away and removed during post-processing after injection molding of the outer foundation 27b.

Figure 3:
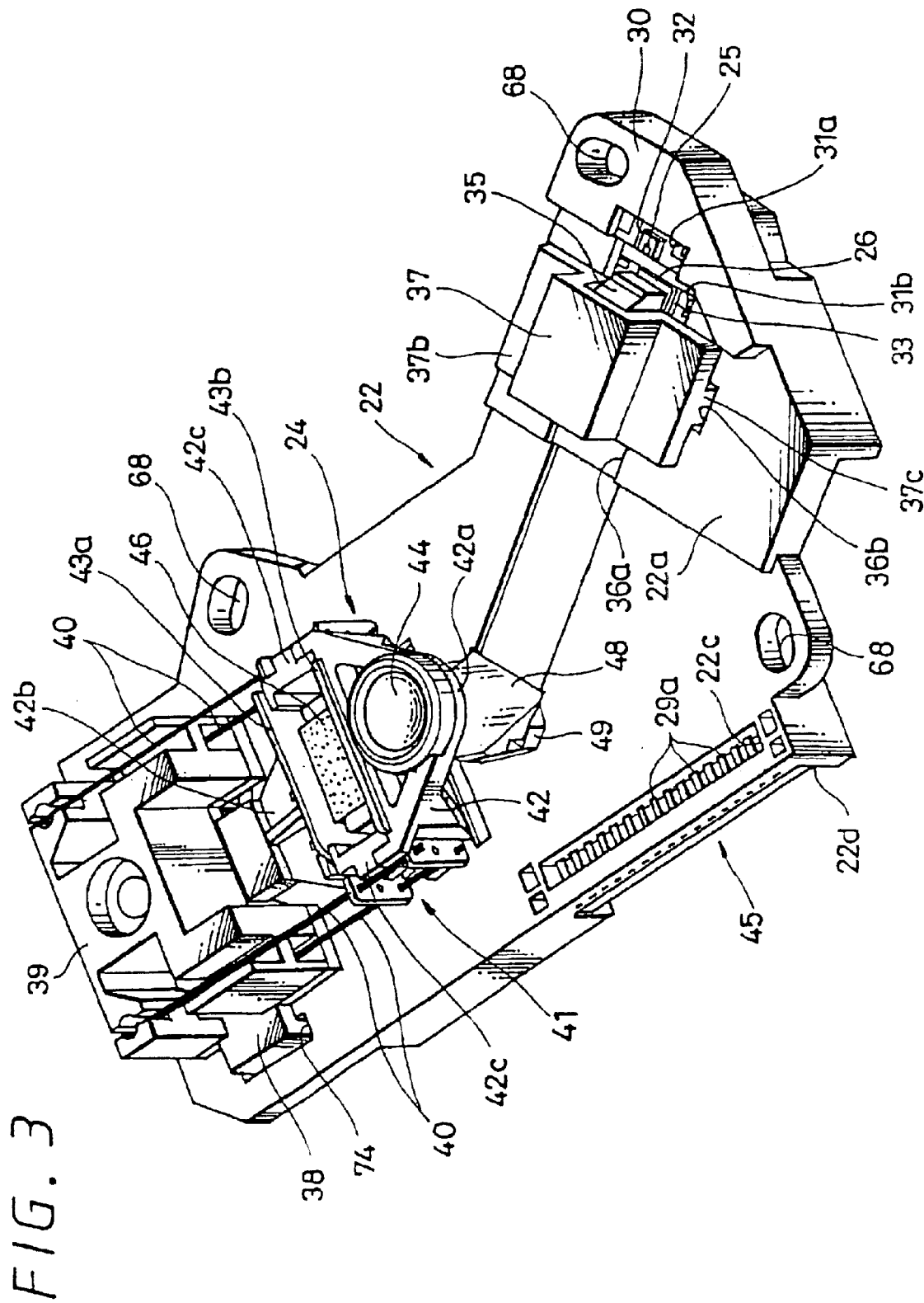
FIG. 3 is a perspective view showing the slide base and objective lens driving device of the first embodiment of an optical pickup device of this invention.

As shown in FIG. 1 and FIG. 3, at the tip of the mounting portion 22a of the base member 22 is provided a pedestal 30, formed by raising the material upward. In the pedestal 30 is provided a first concave portion 31a in which is housed the laser light source 25; and in the mounting portion 22a is provided a second concave portion 31b, in which is housed the photodetector 26. The second concave portion 31b is formed as a square depression of prescribed size in the substantial center of the mounting portion 22a. One edge of the second concave portion 31b reaches to the pedestal 30, and the first concave portion 31a is formed in the top face of the pedestal 30 so as to be open on the side of the second concave portion 31b.

By exposing the circuit core 27a in an appropriate shape, electrical circuit portions 32, 33 are provided in the first and second concave portions 31a, 31b. That is, an electrical circuit 32 for the light source, having a base portion on which is mounted the laser light source 25 and a plurality of terminal portions arranged on the periphery of the base portion, is provided in the first concave portion 31a. And, an electrical circuit 33 for detection, having a base portion on which is mounted the photodetector 26 and a plurality of terminal portions arranged on the periphery of the base portion, is provided in the second concave portion 31b.

Figure 6:
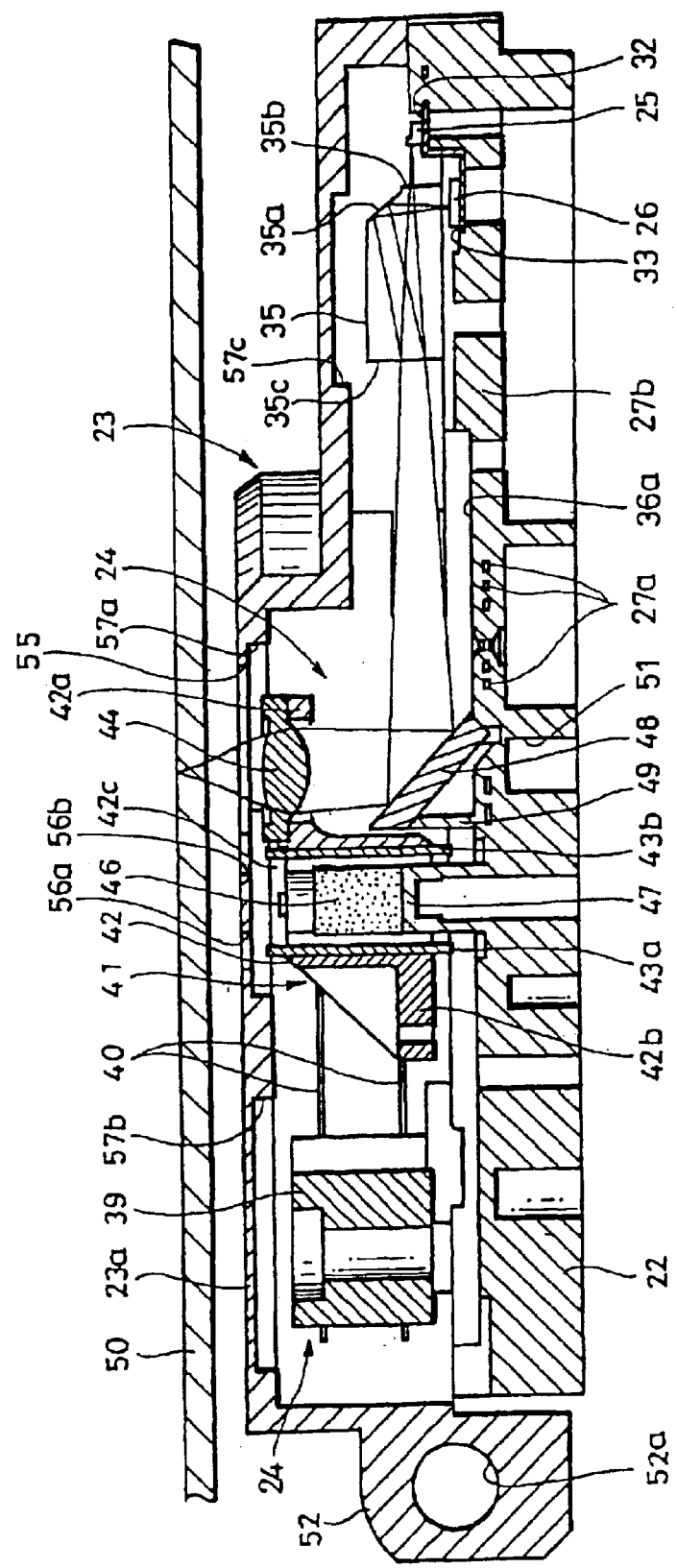
FIG. 6 is an explanatory drawing showing the cross-section along the optical system of the first embodiment of an optical pickup device of this invention.

The laser light source 25 emits a light beam for recording and/or reproduction of information signals; for example, a semiconductor laser (laser diode) may be employed. The laser light source 25 is mounted on the light source electrical circuit 32 with the light beam emission aperture facing in the horizontal direction, as shown in FIG. 6. The photodetector 26 receives the returning light beam reflected by the information recording surface to read information signals, focusing error signals and tracking error signals; for example, a photodiode IC may be employed. This photodetector 26 is mounted on the detector electrical circuit 33, with the light beam receiving aperture facing upward.

Figure 4:
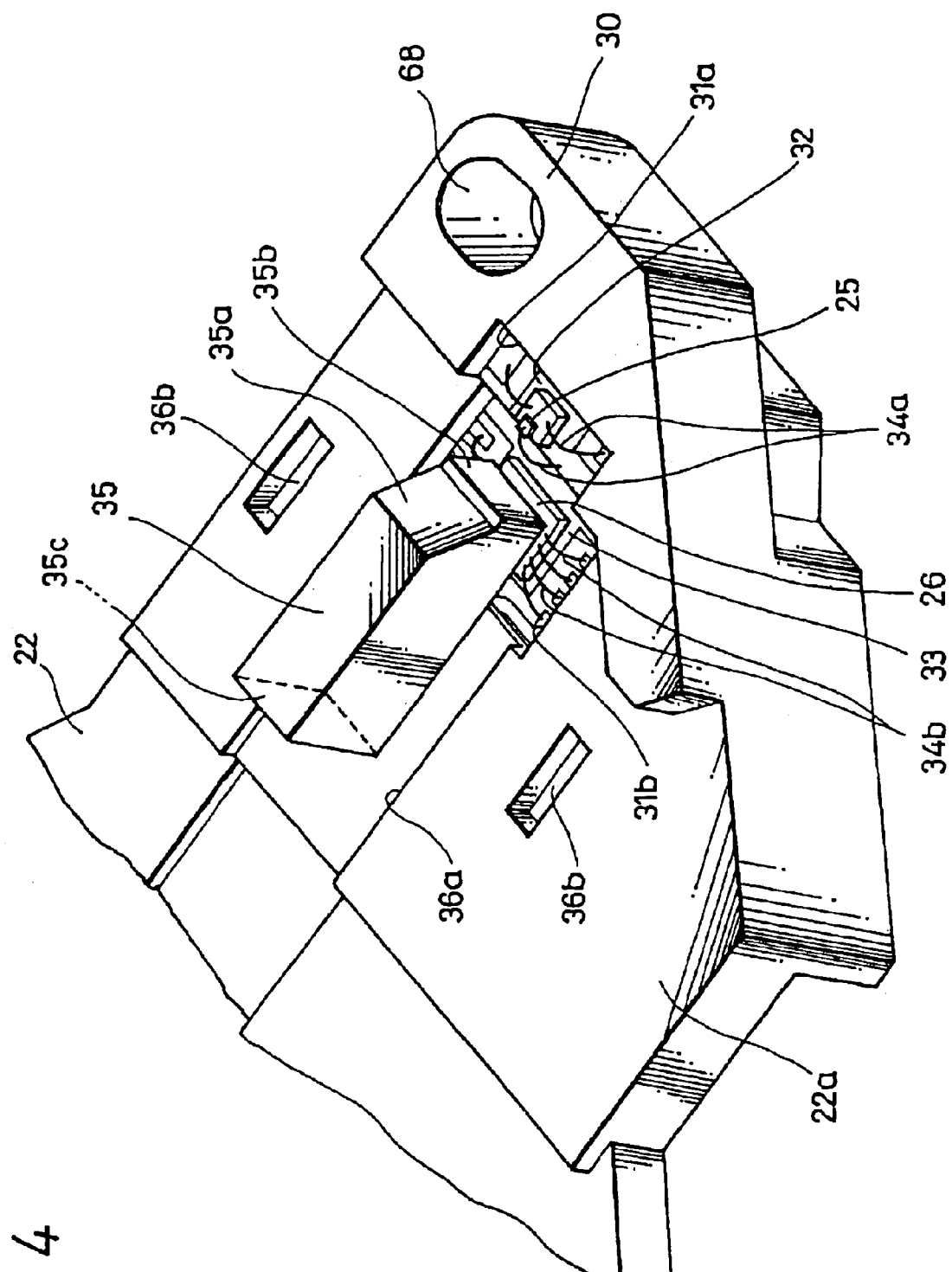
FIG. 4 is a perspective view showing in enlarged form the principal portion of the slide base shown in FIG. 3.

As shown in FIG. 4, the light source electrical circuit 32 and the laser light source 25 mounted thereon are electrically connected by a plurality of wire bonding leads 34a. And, the detector electrical circuit 33 and the photodetector 26 mounted thereon are electrically connected by a plurality of wire bonding leads 34b. A step of an appropriate height is provided between the surface of the light source electrical circuit 32 and the surface of the detector electrical circuit 33, with consideration paid such that the light beam emitted from the laser light source 25 positioned above does not interfere with the photodetector 26 installed below.

Above the photodetector 26, a prism 35 is positioned which transmits the light beam emitted by the laser light source 25, as well as guiding the returning light beam to the photodetector 26. The prism 35 is housed within a guide groove 36a provided in the mounting portion 22a. The prism 35 is positioned such that a portion overlaps in the vertical direction with substantially the entirety of the photodetector 26, with a prescribed gap between.

The prism 35 comprises a block-shape member having an inclined reflecting face 35a on one side in the length direction of the rectangular solid; a first diffraction grating 35b is provided in a face on one end side in the length direction, and a second diffraction grating 35c is provided in the end face on the other side in the length direction. The first diffraction grating 35b of the prism 35 faces the laser light source 25, and the prism 35 is set with the length direction parallel to the direction of propagation of the light beam. The prism 35 is fixed on the base member 22 by a prism holder 37 mounted in the mounting portion 22a.

As shown in FIGS. 1 and 3, the prism holder 37 comprises a member with a tunnel structure having a mating concave portion 37a which mates with the prism 35; flange portions 37b protruding in a direction intersecting the mating concave portion 37a are provided at both ends of the tunnel portion. Latching clasps 37c, protruding downward and having flexibility, are provided at the tips of each of the flange portions 37b. By latching the pair of latching clasps 37c with a pair of clasp holes 36b in the mounting portion 22a, the prism holder 37 is mounted in the base member 22. In this way, the light beam emitted from the laser light source 25 is incident on the first diffraction grating 35b of the prism 35, advances within the prism, and is emitted from the diffraction grating 35c on the opposite side. The returning light beam reflected by the information recording surface is incident again on the second diffraction grating 35c, and here is refracted by a prescribed angle and propagates toward the opposite face 35a. This light beam is reflected by the opposite face 35a and propagates downward, is emitted from the bottom face of the prism 35, and is incident on the light-receiving face of the photodetector 26.

Further, by providing a cutout portion 22b in the base member 22, a plurality of terminals 28b are exposed, and by providing an aperture hole 22c, numerous terminals 29a are exposed. And, by providing a cutout in the outer foundation 27b corresponding to the numerous terminals 29a, a connector portion 45 for connection to external wiring is provided. This connector portion 45 is configured as a ZIF-lock type connector, but this invention is not thus limited; for example, a non-ZIF-type connector can be used, in which external wires are inserted and are fixed in place by the pressure of the connector itself.

The base member 22 with such an electrical circuit incorporated as the circuit core 27a can be connected with the outer foundation 27b using the above-described circuit core 27a as an insert, to enable simple mass production by injection molding. Hence a base member 22 with integrally formed connector portion 45 can be fabricated easily by a single injection molding process.

As shown in FIGS. 1 and 3, a two-axis actuator 24 is mounted integrally, as a specific example of an objective lens driving device, on the upper face of the base member 22. This two-axis actuator 24 comprises a support member 39 fixed to an adjustment plate 38, four support wires 40 fixed to one edge of the support member 39, and a two-axis moveable portion 41 elastically supported by the four support wires 40.

The support member 39 is formed from insulating material, and is fixed to the adjustment plate 38 by fastening screws or other fastening means. The height of the adjustment plate 38 can be adjusted in the vertical direction relative to the base member 22. By adjusting the amount of protrusion upward of the base member 22 using this adjustment plate 38, the height of the two-axis actuator 24 can be adjusted. This adjustment plate 38 is fixed to the base member 22 by adhesive, by welding, or by other fastening means.

The four support wires 40 fixed to each edge of the support member 39 are formed from conductive material having appropriate elasticity. The four support wires 40 are arranged in parallel so as to be symmetrical vertically and laterally, and the tips are fixed to the two-axis moveable portion 41. The two-axis moveable portion 41 comprises a lens holder 42 formed from insulating material, two printed coil boards 43a, 43b fastened to and supporting the lens holder 42 and forming a pair, and an objective lens 44 also fastened to the lens holder 42.

As shown in FIGS. 3 and 6, the lens holder 42 of the two-axis moveable portion 41 has a holder portion 42a to which the objective lens 44 is fixed, a balance portion 42b for weight balance of the holder portion 42a, and right and left linking wall portions 42c, 42c linked between the holder portion 42a and balance portion 42b with a prescribed gap between.

The holder portion 42a of the lens holder 42 has an overhanging portion which overhangs a side similarly to eaves; the objective lens 44 is fitted into the upper portion of a through-hole provided in this overhanging portion, and is fixed into place with adhesive or other fastening means in an integral construction. The first printed coil board 43a is mounted on the inside of the balance portion 42b of the lens holder 42, and the second printed coil board 43b is mounted on the inside of the holder portion 42a.

Figure 9A:
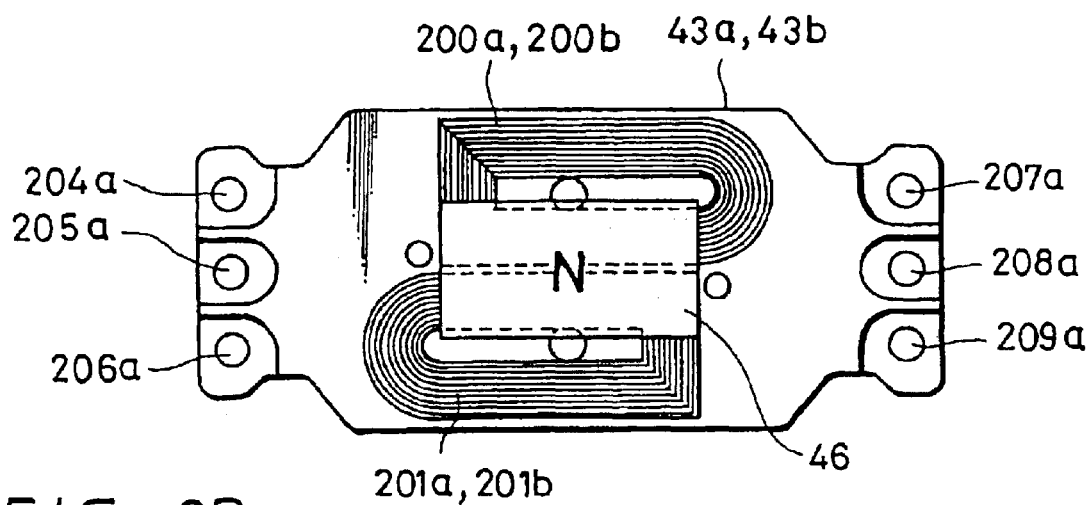
FIG. 9A is an explanatory drawing of a printed coil for focusing, seen from the top side.
Figure 9B:
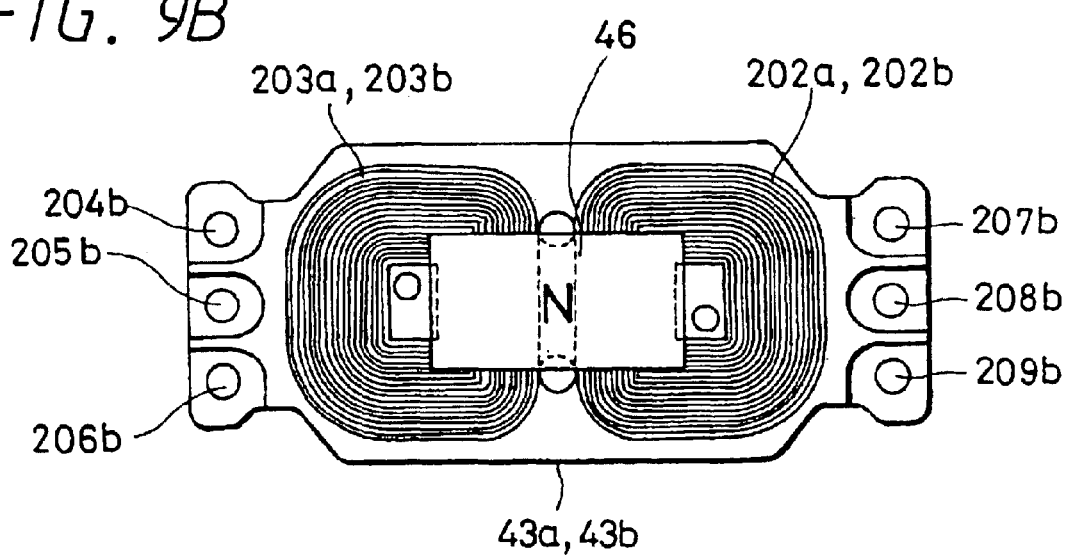
FIG. 9B is an explanatory drawing of a printed coil for tracking, seen from the top side through the bottom side.
Figure 10:
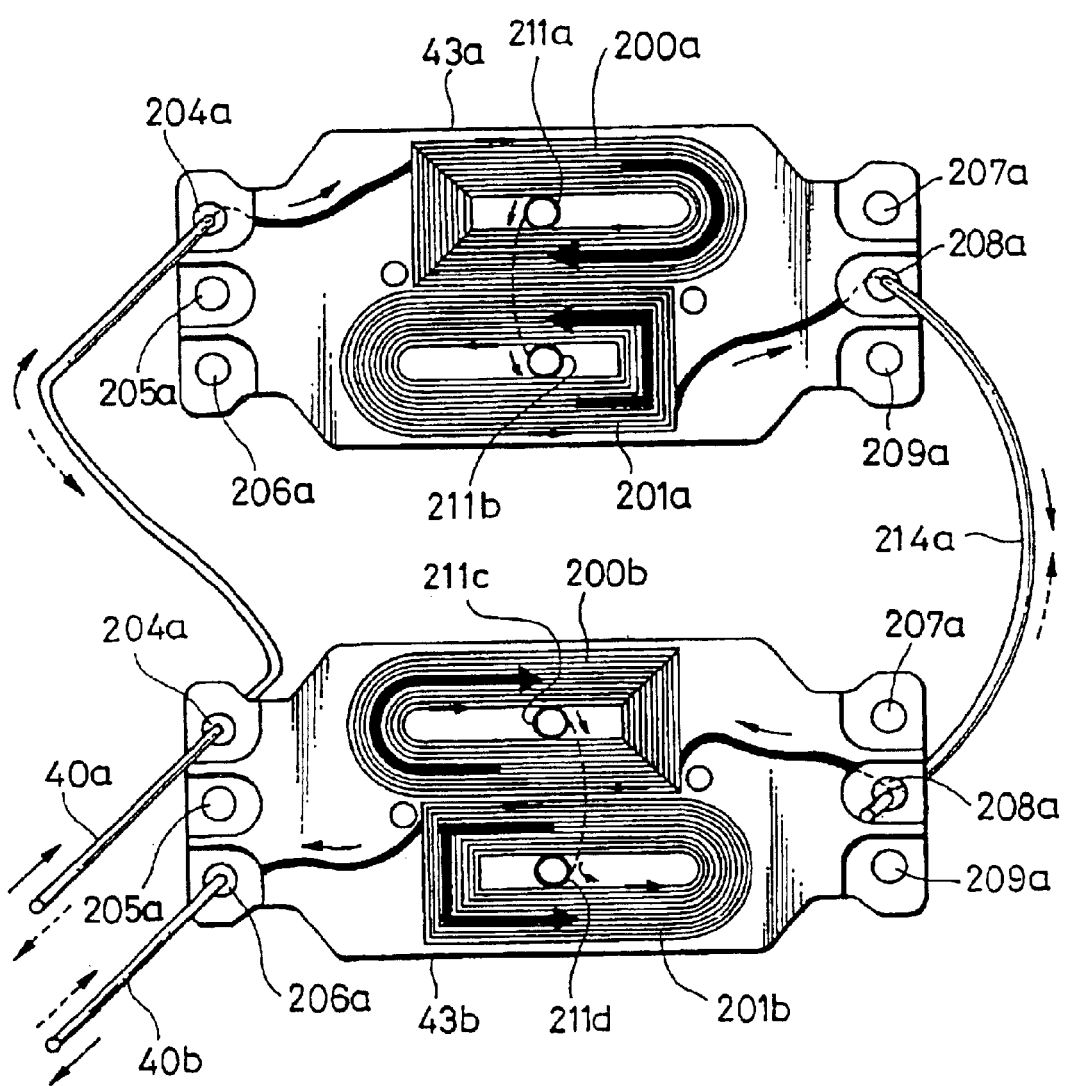
FIG. 10 is an explanatory drawing of the connection state of the printed coils for focusing of a pair of printed coil boards of the first embodiment of an optical pickup device of this invention, seen from the top side.
Figure 11:
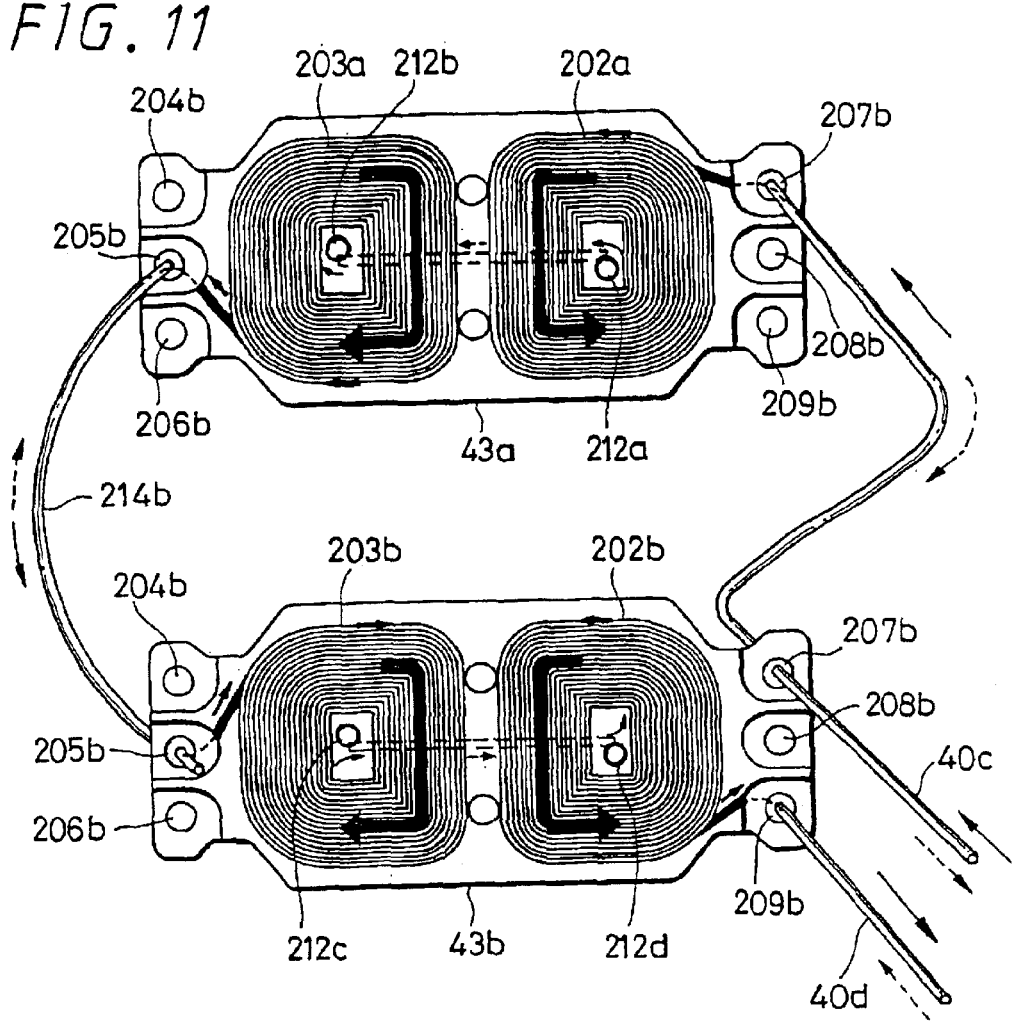
FIG. 11 is an explanatory drawing of the connection state of the printed coils for tracking of a pair of printed coil boards of the first embodiment of an optical pickup device of this invention, seen from the top side through the bottom side.

As shown in FIGS. 9 to 11, the two printed coil boards 43a, 43b have substantially the same shape and construction, with symmetrical directions of winding of the printed coils, and are configured with two types of printed coils superimposed and affixed. In FIG. 9, on what is called the top side, the printed coil shown is formed on the near side of the board, and on what is called the bottom side, the printed coil is formed on the far side of the board.

On the top side (the side near the magnet 46, described below) of the pair of printed coil boards 43a, 43b, as shown in FIG. 9A, horizontally long printed coils 200a, 200b and 201a, 201b for focusing are provided, divided into upper and lower and formed so as to wind about each. On the bottom sides of each printed coil board 43a, 43b (the side far from the magnet 46) are provided printed coils for tracking 202a, 202b and 203a, 203b, made somewhat vertically long, divided into left and right and formed so as to wind about each.

FIG. 10 shows an embodiment of the printed coils for focusing 200a, 200b and 201a, 201b provided on the pair of printed coil boards 43a, 43b positioned on either side of the magnet 46. In FIG. 10, an upper-side printed coil 200a formed so as to wind, for example, clockwise from the outside toward the inside, and a lower-side printed coil 201a formed so as to wind counterclockwise from the inside to the outside, are provided on the top side of the printed coil board (first printed coil board) 43a placed on the far side of the magnet 46.

Also, an upper-side printed coil 200b formed so as to wind, for example, clockwise from the outside toward the inside, and a lower-side printed coil 201b formed so as to wind counterclockwise from the inside to the outside, are provided on the top side of the printed coil board (second printed coil board) 43b placed on the near side of the magnet 46. Because FIG. 10 is a perspective view, the actual printed coils 200b, 202b of the second printed coil board 43b are formed such that, when seen from the front, the clockwise and counterclockwise directions are winding directions opposite those shown.

As shown in FIG. 10, on the right and left edges of the top sides of the pair of printed coil boards 43a, 43b, three connection portions each are provided, for a total of six connection portions 204a, 205a, 206a, 207a, 208a, 209a. The connection portion 204a on the upper-left of the first printed coil board 43a is connected to the outer-periphery end of the upper-side printed coil 200a. From here, the upper-side printed coil 200a winds clockwise toward the inside, and the inner-periphery end is connected to the first through-hole 211a on the upper side.

The first through-hole 211a penetrates the first printed coil board 43a and is connected on the bottom side to a lower-side second through-hole 211b. The second through-hole 211b is connected to the inner-periphery end of the lower-side printed coil 201a. From here the lower-side printed coil 201a winds counterclockwise toward the outside, and the outer-periphery end is connected to the connection portion 208a at the center-right.

The connection portion 208a at the center-right of the second printed coil board 43b is connected to the outer-periphery end of the upper-side printed coil 200b. From here, the upper-side printed coil 200b winds clockwise toward the inside, and the inner-periphery end is connected to a third through-hole 211c on the upper side.

The third through-hole 211c penetrates the second printed coil board 43b and is connected on the back side to the lower-side fourth through-hole 211d. The fourth through-hole 211d is connected to the inner-periphery end of the lower-side printed coil 201b. From here, the lower-side printed coil 201b winds counterclockwise toward the outside, and the outer-periphery end is connected to the connection portion 206a at the lower-left.

As shown in FIG. 11, on the right and left edges of the bottom sides of the pair of printed coil boards 43a, 43b, three connection portions each are provided, for a total of six connection portions 204b, 205b, 206b, 207b, 208b, 209b. The connection portion 207b on the upper-right of the first printed coil board 43a is connected to the outer-periphery end of the right-side printed coil 202a. From here, the right-side printed coil 202a winds counterclockwise toward the inside, and the inner-periphery end is connected to the fifth through-hole 212a on the right side.

The fifth through-hole 212a penetrates the first printed coil board 43a and is connected on the bottom side with the left-side sixth through-hole 212b. The sixth through-hole 212b is connected to the inner-periphery end of the left-side printed coil 203a. From here, the left-side printed coil 203a winds clockwise toward the outside, and the outer-periphery end is connected to the connection portion 205b at the center-left.

The connection portion 205b at the center-left of the second printed coil board 43b is connected to the outer-periphery end of the left-side printed coil 203b. From here, the left-side printed coil 203b winds clockwise toward the inside, and the inner-periphery end is connected to the left-side seventh through-hole 212c.

The seventh through-hole 212c penetrates the second printed coil board 43b and is connected on the bottom side to the right-side eighth through-hole 212d. The eighth through-hole 212d is connected to the inner-periphery end of the right-side printed coil 202b. From here, the right-side printed coil 202b winds counterclockwise toward the outside, and the outer-periphery end is connected to the connection portion 209b at the lower-right.

Figure 7:
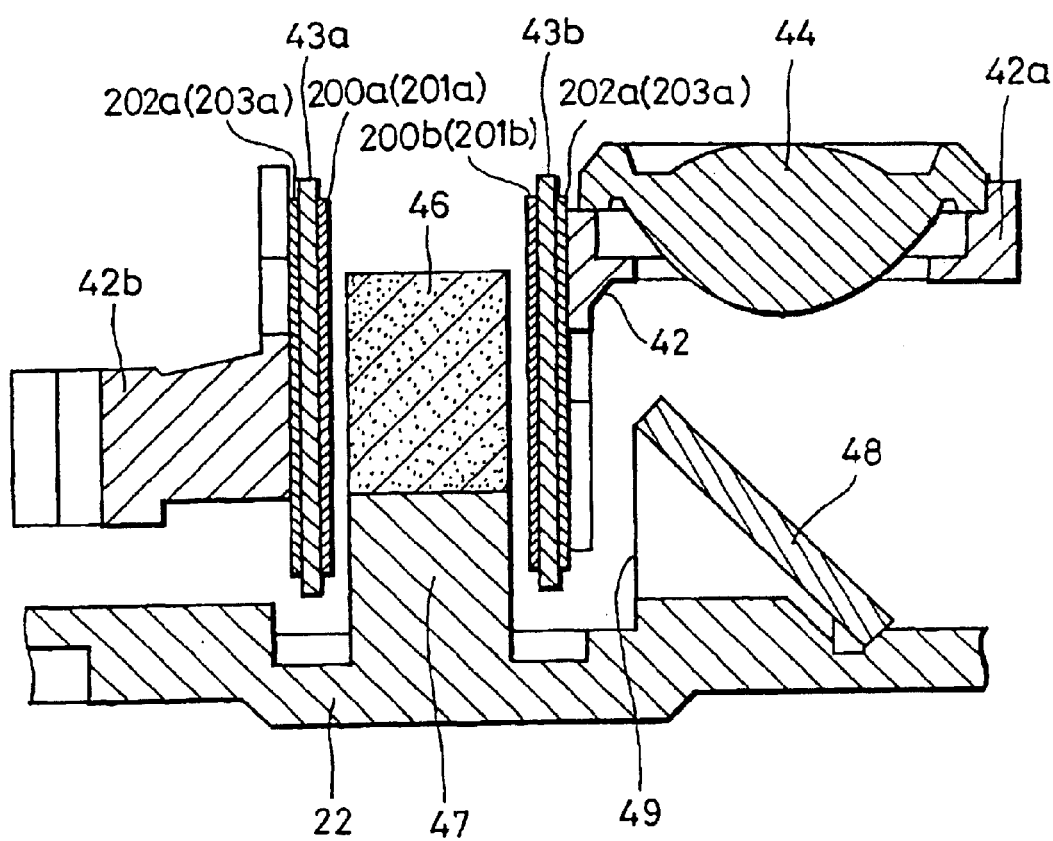
FIG. 7 is a cross-sectional view showing in enlarged form the principal portion of the optical pickup device shown in FIG. 6.

The two printed coil boards 43a, 43b having the above configuration are positioned in parallel, with a prescribed gap between, as shown in FIGS. 6 and 7, and are fixed in place to the lens holder 42. Each of the ends of the four support wires 40a, 40b, 40c, 40d and the connection wires 214a, 214b comprising two conductive wires are connected to the connection portions 204a to 209a and 204b to 209b of the two printed coil boards 43a, 43b.

In other words, as shown in FIG. 10, the first support wire 40a passes through the connection portion 204a at the upper-left of the second printed coil board 43b and is connected to the connection portion 204a at the upper left of the first printed coil board 43a. The second support wire 40b is connected to the connection portion 206a at the lower-left of the second printed coil board 43b. And, one end of the first connection wire 214a is connected to the center-right connection portion 208a of the first printed coil board 43a, while the other end is connected to the center-right connection portion 208a of the second printed coil board 43b.

As shown in FIG. 11, the third support wire 40c passes through the upper-right connection portion 207b of the second printed coil board 43b and is connected to the upper-right connection portion 207b of the first printed coil board 43a. The fourth support wire 40d is connected to the lower-right connection portion 209b of the second printed coil board 43b. And, one end of the second connection wire 214b is connected to the center-left connection portion 205b of the first printed coil board 43a, while the other end is connected to the center-left connection portion 205b of the second printed coil board 43b.

Each of the other ends of the four support wires 40a to 40d is provided with an end extending somewhat past the block-shape support member 39. The support wires 40a to 40d and connection wires 214a, 214b are connected to the connection portions 204a to 209a and 204b to 209b of the printed coil boards 43a, 43b by soldering or other joining means.

Each of the other ends of these support wires 40a to 40d is connected to a wiring pattern of a flexible printed circuit board. The wiring pattern of the flexible printed circuit board is connected to a wiring pattern provided directly on the slide base 21. A portion of the wiring pattern is wired in a prescribed shape on the base member 22, and a portion is assembled in one place and collected at the connector portion 45.

In this embodiment, a configuration is employed in which the two printed coil boards 43a, 43b are affixed to the lens holder 42 with adhesive; but this invention is not thereby limited, and for example, during injection molding of the lens holder 42, a two-color molding or other method may be used in integral molding.

As shown in FIGS. 6 and 7, between the two printed coil boards 43a, 43b, a magnet 46 is provided so as to intervene, with a prescribed gap, between the printed coils The magnet 46 comprises a rectangular solid, with one magnetized pole; for example, the north pole or south pole may be made to face the surface of the first printed coil board 43a, with a different pole on the opposite side opposing the surface of the second printed coil board 43b. Of course depending on the coils used, a magnet with two magnetized poles maybe used, positioned with the same pole opposing the printed coil boards 43a, 43b.

A support base 47, protruding upward, is provided on the base member 22 for the purpose of supporting and fixing in place the magnet 46 in a prescribed position and at a prescribed height. The magnet 46 is mounted directly onto and fixed in place by this support base 47, without any intervening parts. The surfaces of each of the printed coils of the first and second printed coil boards 43a, 43b are configured to be parallel or substantially parallel to the opposing faces of the opposing magnet 46.

Further, a pair of clamping pieces 47a, 47a which clamp the magnet 46 is provided on the support base 47. By fitting the magnet 46 between these clamping pieces 47a, 47a and placing the magnet on the support base 47, the magnet 46 can be positioned in the above-described parallel direction. The clamping force of the pair of clamping pieces 47a alone may be employed; but it is preferable that adhesive be used to fix the magnet 46 to the support stand 47.

In this way, by directly fixing the magnet 46 onto the base member 22, use of a part corresponding to a conventional yoke is abolished, and the number of parts can be reduced. And, by employing as the material of the base member 22 a nonmagnetic resin material, further cost reductions can be achieved. Because the magnet 46 can be mounted on the support base 47 merely by latching using the pair of clamping pieces 47a, the assembly process can be made extremely easy, and positioning can be performed with higher precision.

The two printed coil boards 43a, 43b are positioned in parallel at positions substantially symmetric with respect to the magnet 46, such that the combined propulsion point due to the printed coils 200a, 201a, 202a and 203a (or 200b, 201b, 202b and 203b) is substantially the same as the center of the magnet 46. Below the objective lens 44, the optical axis of which is set in the vertical direction, a reflecting mirror 48 is positioned which reflects the incident light beam to change its direction of propagation. The reflecting mirror 48 is fixed on an inclined face of the mirror cradle 49 provided on the base member 22. Due to the inclined face of the mirror cradle 49, the reflecting face of the reflecting mirror 48 is set in an inclined plane which makes an angle which is substantially 45° with the horizontal plane. The center of the reflecting face of the reflecting mirror 48 coincides or substantially coincides with the center of the optical axis of the light beam emitted from the laser light source 25.

Thus when the light beam, after passing through the prism 35 and propagating horizontally, reaches the reflecting mirror 48, the beam is bent 90° or in a right angle by the reflecting face and propagates upward, passing through the objective lens 44. After being condensed by the objective lens 44, the light beam is incident on the information recording surface of the optical disc 50. After being reflected by the information recording surface, the light beam again passes through the objective lens 44 and propagates downward. When this returning light beam reaches the reflecting mirror 48, it is bent 90° by the reflecting face, and then propagates in a horizontal direction orthogonal to the optical axis of the objective lens 44.

By this two-axis actuator 24, a force propelling the lens holder 42 fixed to the pair of printed coil boards 43a, 43b can be generated at will in the vertical or lateral directions according to the currents flowing in the four support wires 40a to 40d. As a result, due to the occurrence of this propelling force, the two-axis moveable portion 41, having the pair of printed coil boards 43a, 43b, the objective lens 44 and the lens holder 42, is moved in two mutually orthogonal directions, and focusing and/or tracking control driving of the light beam passing through the objective lens 44 is executed.

A cover member 23, the object of which is to be guided by the guide axis while keeping dust from the two-axis actuator 24, is mounted onto the base member 22 on which is positioned the two-axis actuator 24 with the above-described configuration. This cover member 23, while mounted onto the base member 22, is fixed in place by fastening screws or other fastening means, to constitute the slide base 21.

Figure 5:
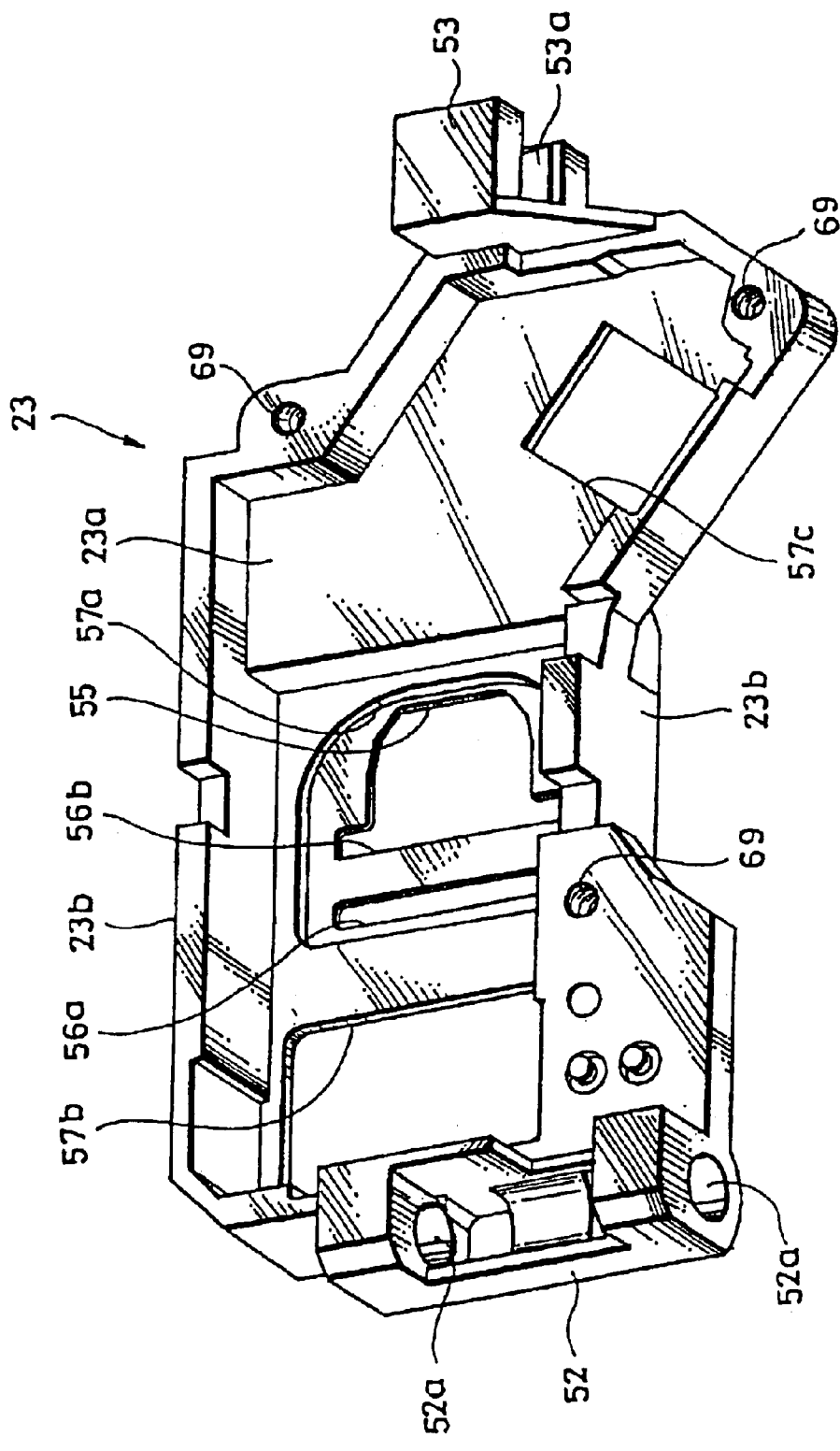
FIG. 5 is a perspective view of the slide base shown in FIG. 3, seen from the bottom side.

As shown in FIG. 1 and FIG. 5, the cover member 23 has an upper face portion 23a covering the upper face of the base member 22 and a side face portion 23b surrounding the periphery of this upper face portion 23a, and is formed as a lid-shaped member with hole openings in the lower face. Hence the upper face portion 23a of the cover member 23 has a shape substantially similar to, but somewhat enlarged compared to, the plane shape of the base member 22; a principal bearing 52 is provided on one side in the length direction, and a secondary bearing 53 is provided on the other side in the length direction.

The principal bearing 52 of the cover member 23 has two bearing portions, opposed across a prescribed gap, in the width direction of the upper face portion 23a, and bearing holes 52a with common shaft center line are provided in each bearing portion. A first guide shaft, described below, is slideably inserted into these bearing holes 52a. A bearing groove 53a, open in the side direction, is provided in the secondary bearing 53, and a second guide shaft, described below, is slideably latched in this bearing groove 53a. On the bottom face of the bearing groove 53a is provided a guide protruding portion 54 to reduce looseness with the second guide shaft and to alleviate friction resistance during sliding.

At the substantial center of the upper face portion 23a of the cover member 23 are provided an aperture window 55 to expose the objective lens 44 of the two-axis actuator 24, and two aperture grooves 56a, 56b to allow vertical motion of the pair of printed coil boards 43a, 43b. In the inner face of the upper face portion 23a above the two-axis actuator 24, are provided a first escape concave portion 57a to avoid interference with the two-axis moveable portion 41, a second escape concave portion 57b to avoid interference with the support member 39, and a third escape concave portion 57c to avoid interference with the prism holder 37, as shown in FIG. 6.

Figure 8:
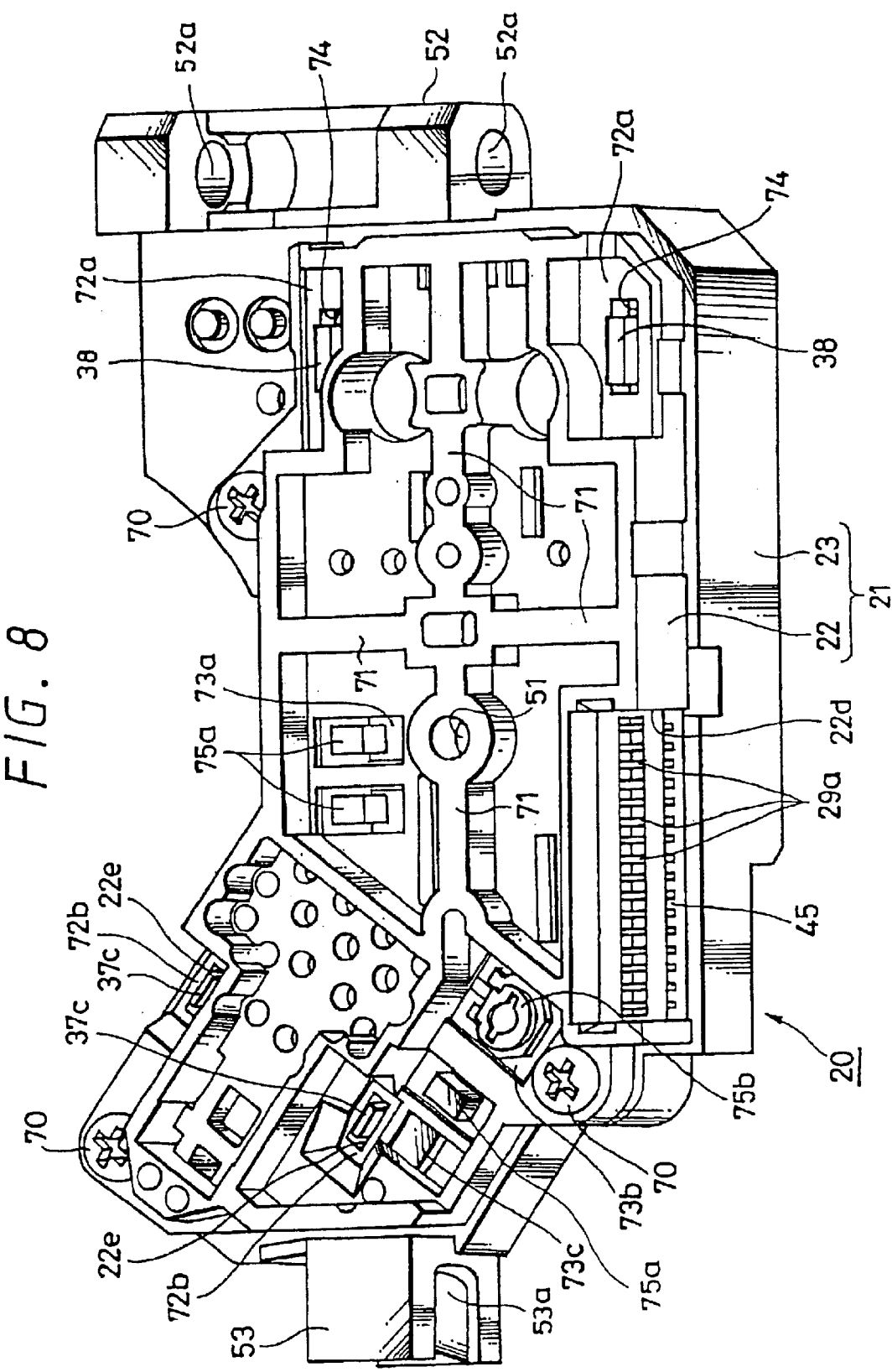
FIG. 8 is a perspective view of the first embodiment of an optical pickup device of this invention, seen from the bottom side.

As described above, the base member 22 and cover member 23 are attachably and removeably fixed by fastening screws 70 as one specific example of fastening means, as shown in FIG. 8. Consequently in the base member 22, as shown in FIG. 3, insertion holes 68 penetrating in the vertical direction are provided in three places in the outer foundation 27b. Corresponding to these, screw holes 69 are provided in three places in the cover member 23 to coincide with the insertion holes 68 of the base member 22, as shown in FIG. 5.

After mounting the cover member 23 by fitting onto the base member 22, by passing screw shafts through each of the insertion holes 68 and screwing the tips into the screw holes 69, and then tightening the fastening screws 70, the slide base 21 is combined into a whole by the three fastening screws 70, as shown in FIG. 8.

A plurality of ribs 71 are provided in the bottom surface of the base member 22 of this slide base 21, and by these ribs 71 the base member 22 is strengthened. On the bottom surface of the base member 22, a plurality of metal exposure portions 72a, 72b and circuit exposure portions 73a, 73b, 73c are formed by exposing a portion of the circuit core 27a. The object of the metal exposure portions 72a, 72b is not to constitute an electrical circuit, but to support or fix parts. On the other hand, the circuit exposure portions 73a to 73c are configured as a portion of an electrical circuit.

Penetrating holes 74 are provided in each of a pair of first metal exposure portions 72a, 72a; a pair of leg pieces of the adjustment plate 38 are inserted into these penetrating holes 74. The pair of leg pieces is bonded by solder-welding to the first metal exposure portion 72a, and by this, the adjustment plate 38 is fixed to the base member 22. Clasp holes 22d are provided in each of the pair of second metal exposure portions 72b, and the pair of latching clasps 37c of the prism holder 37 are inserted into these clasp holes 22d. The pair of latching clasps 37c is jointed by solder-welding to the second metal exposure portions 72b, and by this, the prism holder 37 is installed on the base member 22. A plurality of capacitors 75a are mounted by solder-welding onto the first circuit exposure portion 73a, which constitutes a portion of an electrical circuit. Similarly, variable resistances 75b are mounted by solder-welding onto the second circuit exposure portion 73b which constitutes a portion of an electrical circuit. It is preferable that the surfaces of these first and second circuit exposure portions 73a, 73b be subjected to solder plating, gold plating, or other plating treatment (the metal exposure portions 72a, 72b may also be subjected to plating treatment). By performing such plating treatment, conductors can be joined even at comparatively low temperatures, so that even chip parts which are relatively vulnerable to high temperatures, such as capacitors and resistors, can easily be mounted by soldering onto the electrical circuit.

The third circuit exposure portion 73c prevents electrostatic breakdown of the semiconductor laser used as the laser light source 25. By grounding (GND) one of the metal exposure portions of the third circuit exposure portion 73c and setting the other metal exposure portion to land level (LD), a land for ground function which prevents electrostatic breakdown of the semiconductor laser is effected.

By the base member 22 comprising the circuit core 27a and outer foundation 27b, capacitors, resistors and other electronic parts can be directly mounted on the base member 22 without requiring the use of flexible flat cables (FF cables), so that the optical pickup device 20 can be made compact and lightweight. And, optical parts and the objective lens driving device, the purpose of which is not electrical connections, can be fixed in place mechanically to the base member 22 using solder-welding, so that fixing of optical parts and similar to the base member 22 can be performed simply and reliably.

Operation to record and/or reproduce information signals by an optical pickup device 20 with such a configuration may be performed, for example, as follows. As shown in FIG. 6, a light beam emitted from the laser light source 25 propagates in a horizontal direction and is incident on the first diffraction grating 35b of the prism 35, is divided into three rays by the first diffraction grating 35b, and propagates in a horizontal direction. After passing through the prism 35, the beam is emitted from the side of the second diffraction grating 35c, and is incident on the reflecting mirror 48. When incident on the reflecting mirror 48, the light beam is reflected upward by the reflecting surface and the propagation path is changed by 90°; the beam is then incident on and condensed by the objective lens 44 above.

Having been condensed by the objective lens 44, the light beam is incident on the information recording surface of the optical disc 50 positioned above, and is reflected by the surface and returns. That is, the light beam reflected by the information recording surface returns along the optical path previously traveled, propagating downward and passing through the objective lens 44. After passing through the objective lens 44, the direction of the light beam is changed 90° by the reflecting mirror 48 and the beam propagates in a horizontal direction, and is incident on the prism 35 from the second diffraction grating 35c. The returning light beam, when incident on the prism 35, is somewhat refracted upwards by the second diffraction grating 35c, and is reflected by the reflecting face 35a. Upon being reflected by the reflecting face 35a, the direction of propagation of the light beam is changed to the downward direction, and after emission from the bottom face of the prism 35 the beam is incident on the light-receiving portion of the photodetector 26.

By reading the state of the light beam thus emitted from the laser light source 25 and incident on the photodetector 26, information signals recorded in advance on the information recording surface can be read (reproduced), and in addition focusing error signals and tracking error signals occurring at the time of readout can simultaneously be read. Further, by emitting a light beam with high output from the laser light source 25, the light beam can be used to write (record) new information signals on the information recording surface.

Figure 14:
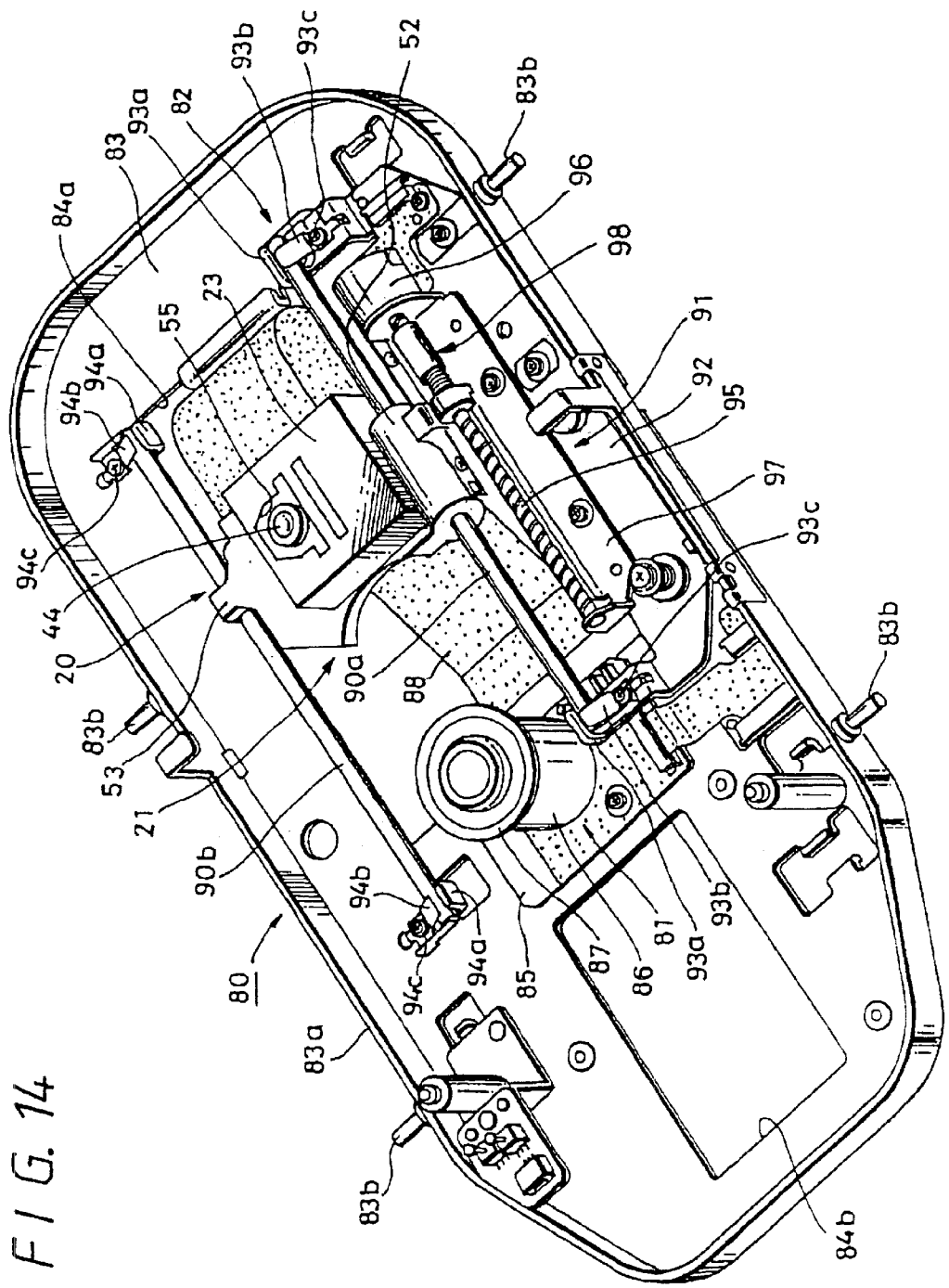
FIG. 14 is a perspective view showing an optical information recording and/or reproduction device of this invention.

An optical pickup device 20 having a configuration such as described above can be used in a disc recording/reproduction device 80, a specific example of which is for example an optical information recording and/or reproduction device with the configuration shown in FIG. 14. This disc recording/reproduction device 80 comprises a disc rotation device 81, which chucks and drives in rotation an optical disc at a prescribed speed (for example, at constant linear velocity); the above-described optical pickup device 20, which performs recording (writing) and reproduction (readout) of information signals on the information recording surface of the optical disc mounted on and driven in rotation by the disc rotation device 81; a pickup movement device 82 which causes the optical pickup device 20 to advance and retreat so as to approach and move away from the disc rotation device 81; and a chassis 83 on which the above are mounted.

As the optical disc, for example, a read-only optical disc on which have been recorded in advance music signals as audio information, image and music signals as video information, or other information signals; a write-once (append-type) optical disc onto which music, image, or other information signals can be recorded once; or an optical disc which can be repeatedly recorded any number of times (rewritable), or various other optical discs can be used. The optical disc is hot limited to these optical disc types; for example, a magneto-optical disc, in which a magnetic thin film layer is formed on the surface of a thin disc and an optical head and magnetic head are used to write information to or read information from the magnetic thin film layer, as well as other types of disc-shape recording media, can be used.

The chassis 83 of the disc recording/reproduction device 80 has a substantially rectangular or other planar shape, and a reinforcing peripheral wall 83a is provided by continuously raising the periphery upward. At four places on the peripheral wall 83a are provided support protrusions 83b for use in mounting the chassis 83 in, for example, a CD (compact disc) player or DVD (digital versatile disc) player or other electronic equipment.

A first aperture portion 84a is provided at substantially the center of this chassis 83, and a second aperture portion 84b is provided on an end. The disc rotation device 81 is placed between the first aperture portion 84a and the second aperture portion 84b of the chassis 83, and the optical pickup device 20 is positioned so as to straddle the first aperture portion 84a. The pickup movement device 82 is positioned on one side of the optical pickup device 20.

The disc rotation device 81 comprises a motor baseplate 85, a spindle motor 86 fixed to the motor baseplate 85, and a turntable 87 provided integrally with the rotation portion of the spindle motor 86. The spindle motor 86 is mounted on the motor baseplate 85, which is of thin sheet metal; the motor baseplate 85 is fixed in place on the chassis using fastening screws or other fastening means. One end of an FF cable 88 is fixed in place using adhesive or other fastening means to the upper surface of the motor baseplate 85.

The spindle motor 86 has a stationary portion which is fixed to the motor baseplate 85 and a rotation portion which is rotatably supported by the stationary portion; a turntable 87 is provided integrally on the rotation shaft which is the center of rotation of the rotation portion. The turntable 87 has a mating portion which mates with the center hole of the optical disc, and a placement portion, continuous with the lower portion of the mating portion, and on which is placed the periphery of the center hole of the optical disc. Within the mating portion is incorporated a magnet which attracts a chuck ring, not shown. The chuck ring is attracted by this magnet, and by clamping the periphery of the center hole of the optical disc between the chuck ring and the placement portion, the optical disc is chucked and is in a state enabling rotation together with the turntable 87. The pickup movement device 82 comprises a pair of guide shafts 90a, 90b which guide the motion of the optical pickup device 20, and a feed-screw driving device 91 which causes the optical pickup device 20 to advance and retreat. The pair of guide shafts 90a, 90b are positioned in parallel in positions so as to surround both sides of the spindle motor 86. Each of the guide shafts 90a, 90b is formed from a rod-shaped member the outer surface of which is smooth.

The first guide shaft 90a slideably penetrates the bearing hole 52a of the principal bearing 52 provided on the cover member 23, constituting a portion of the slide base 21 of the optical pickup device 20, and both ends are supported by the adjustment plate 92. The second guide shaft 90b slideably penetrates the bearing groove 53a of the secondary bearing 53 provided in the cover member 23, and both ends are supported by the chassis 83. The adjustment plate 92 is mounted on the chassis 83 in a manner enabling change of the attitude, and by changing the attitude of the adjustment plate 92, the degree of parallelism of the pair of guide shafts 90a, 90b can be adjusted.

Among the pair of guide shafts 90a, 90b, the first guide shaft 90a is supported by a pair of shaft support pieces 93a, 93a provided on the adjustment plate 92. Each of the shaft support pieces 93a is provided such that the shaft restraint pieces 93b form a pair. By using a fastening screw 93c to screw the shaft restraint pieces 93b in place, each of the ends of the first guide shaft 90a is fixed to the shaft support pieces 93a. The second guide shaft 90b is supported by a pair of shaft support pieces 94a, 94a provided on the chassis 83. A shaft restraint piece 94b is provided on each shaft support piece 94a so as to form a pair. By using a fastening screw 94c to screw the shaft restraint pieces 94b in place, both of the ends of the second guide shaft 90b are supported by the chassis 83.

Figure 15:
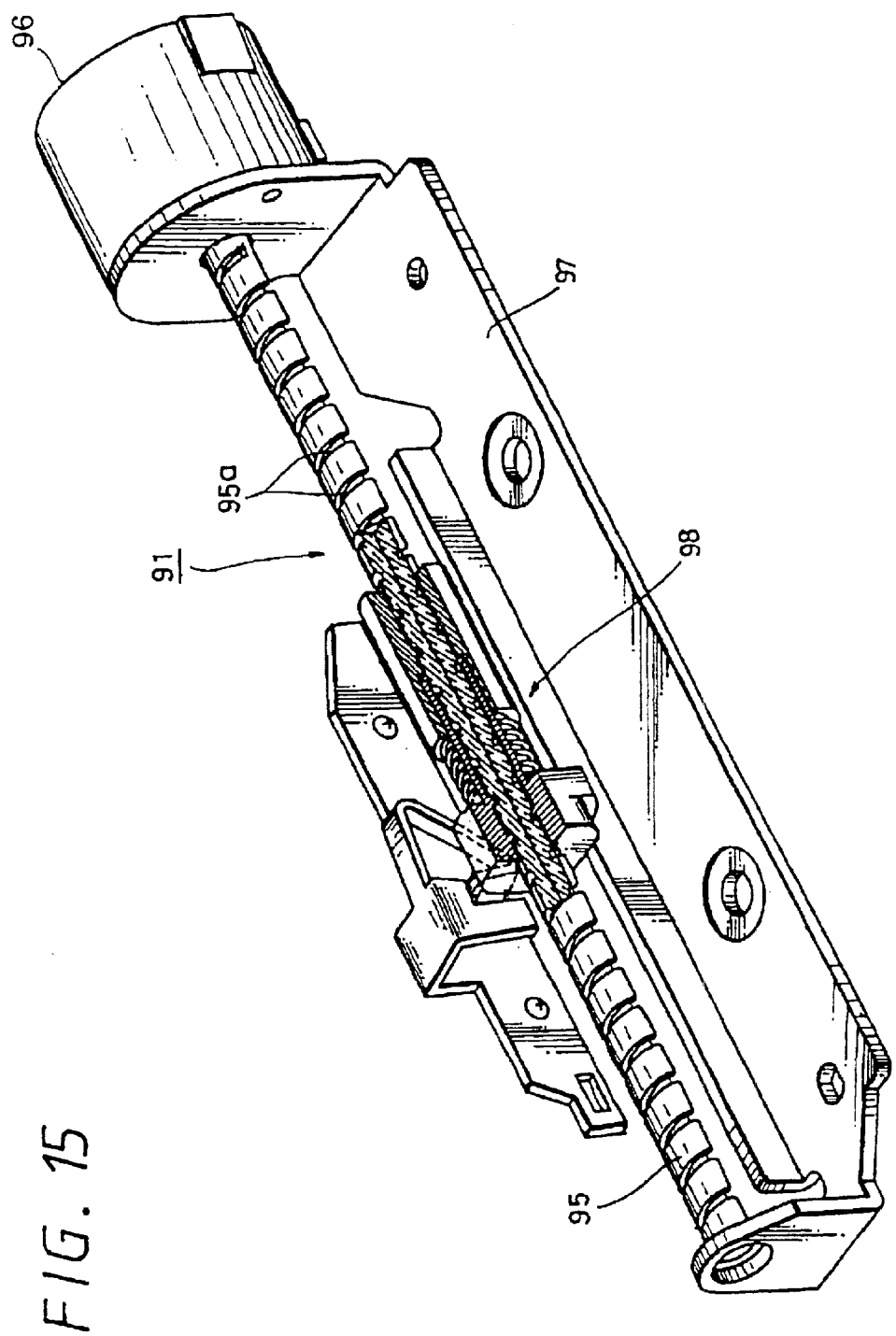
FIG. 15 is a perspective view showing the feed-screw driving device of the optical pickup device of an optical information recording and/or production device of this invention.

The feed-screw driving device 91 is installed on the adjustment plate 92. As shown in an enlarged view in FIG. 15, the feed-screw driving device 91 comprises a feed screw 95, feed motor 96, support plate 97, and power transmission member 98. The feed screw 95 is formed by providing on the outer face of a round rod, shorter than the guide shafts 90a, 90b, a single screw groove 95a extending helically over substantially the entire length in the axis direction. This feed screw 95 also serves as a rotation shaft for the feed motor 96 which is the driving source, and is directly driven in rotation.

Figure 16:
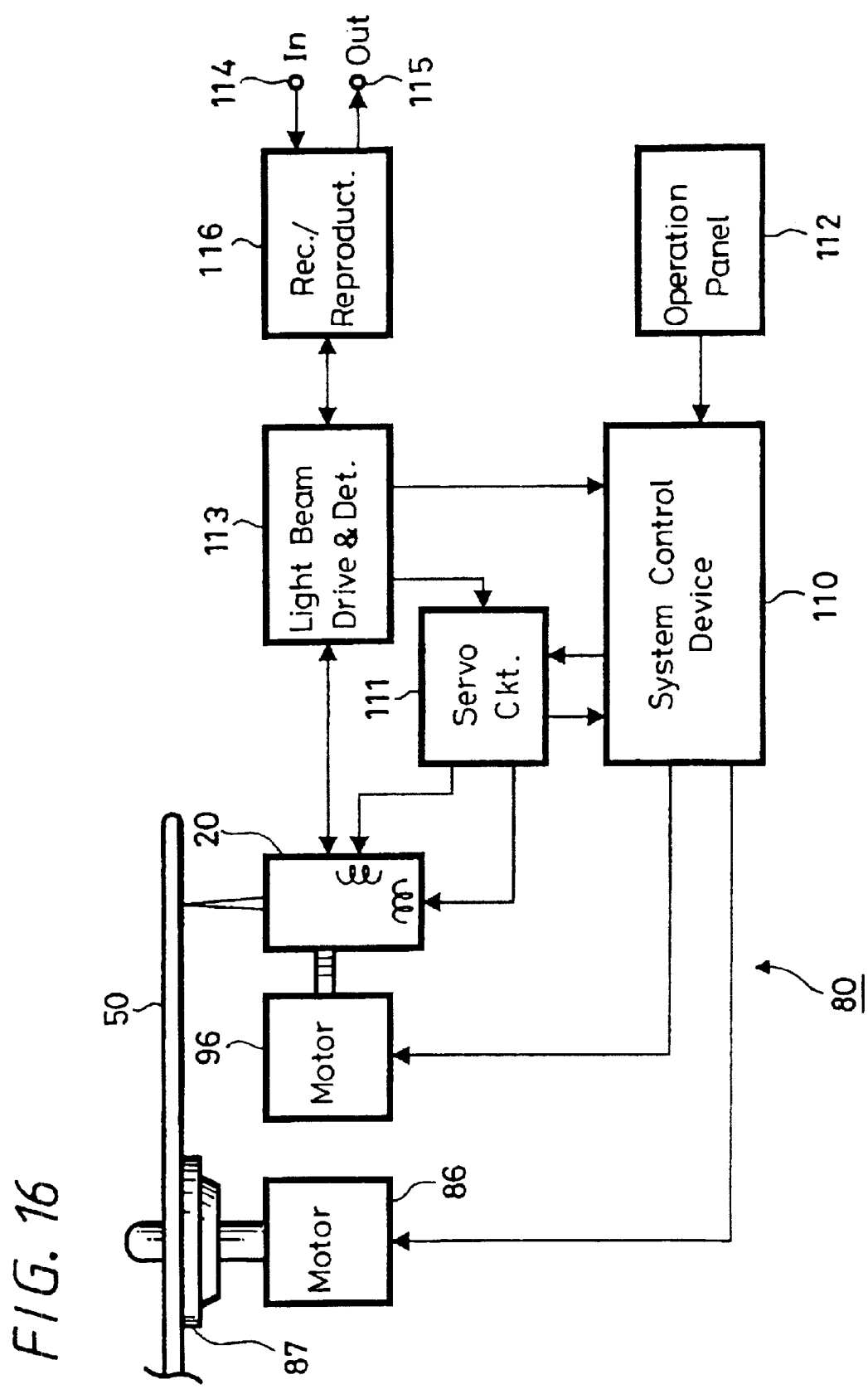
FIG. 16 is an explanatory block diagram showing in summary the configuration of an embodiment of an optical information recording and/or reproduction device of this invention.

Next, the configuration of a circuit for driving and controlling the above-described disc recording/reproduction device 80 is explained. FIG. 16 shows a specific example of the circuit configuration of a disc recording/reproduction device 80 of this embodiment, and is an explanatory block diagram of a device capable of both recording (writing) and reproduction (reading) of information signals.

In FIG. 16, the symbol 110 denotes a system control device which drives and controls the spindle motor 86 and feed motor 96. This system control device 110 is connected so as to be capable of exchanging signals with a servo circuit 111 which executes servo control of the optical pickup device 20. The system control device 110 is connected to an operation panel 112, on which are provided a power supply switch and various operation buttons and similar. The optical pickup device 20 is connected to a light beam driving and detection circuit 113; the output of this driving and detection circuit 113 is supplied to the system control device 110 and to the servo circuit 111. Further, the driving and detection circuit 113 is connected to a recording/reproduction circuit 116, which is connected to an input terminal 114 and an output terminal 115.

By a disc recording/reproduction device 80 configured in this way, recording and/or reproduction of information signals onto and from an optical disc 50 is performed in, for example, the following manner. First, by operating the operation panel 112, a user inputs operation information to the system control device 110, and based on this operation information, control signals are output from the system control device 110 to the spindle motor 86, feed motor 96, and servo circuit 111.

When control signals are supplied to the spindle motor 86 from the system control device 110, the spindle motor 86 is driven in rotation such that, for example, the linear velocity is constant. Also, the feed motor 96 is driven by control signals from the system control device 110, and through driving of the feed motor 96, the optical pickup device 20 is moved such that the light beam irradiates a desired position on the information recording surface of the optical disc 50.

Then, information signals from the input terminal 114 are, for example, supplied via the recording/reproduction circuit 116 to the light beam driving and detection circuit 113. By controlling the light beam output in the optical pickup device 20 according to signals from this driving and detection circuit 113, information signals from the input terminal 114 are recorded on the information recording surface of the optical disc 50. Also, information signals recorded in advance on the information recording surface of the optical disc 50 are detected by the driving and detection circuit 113, and the detected information signals are output from the output terminal 115 via the recording/reproduction circuit 116.

Together with this, in the driving and detection circuit 113 the tracking error signal and focusing error signal of the light beam are detected, and these error signals are supplied to the servo circuit 111. By this, control signals are supplied to the optical pickup device 20 from the servo circuit 111, and control and driving of tracking and/or focusing by the above-described two-axis actuator 24 are performed. Also, by supplying operation signals from the operation panel 112 to the system control device 110, the optical pickup device 20 can be moved to desired recording or reproduction positions, or otherwise controlled. And, the light beam from the optical pickup device 20 comprising the two-axis actuator 24 is incident on the information recording surface of the optical disc 50, by which information signal recording and reproduction are performed.

In the two-axis actuator 24 of this embodiment, by using the two printed coil boards 43a, 43b as described above, control and driving not possible using conventional wound coils can be performed. This point is explained referring to FIGS. 12A and 12B.

Figures 12A, 12B:
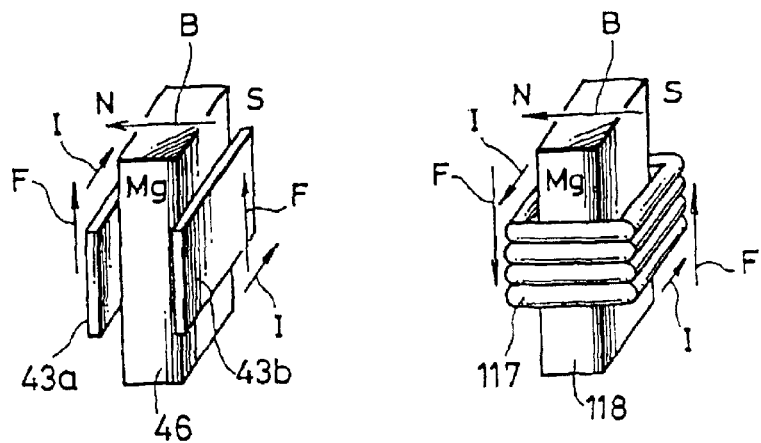
FIG. 12A is an explanatory drawing for the case of a pair of printed coil boards of an embodiment of an optical pickup device of this invention.
FIG. 12B is an explanatory drawing for the case of a conventional wound coil.

In the case of the conventional wound coil 120 shown in FIG. 12B, if for example the direction of magnetic flux B is toward the left, then the direction of the current I is reversed on the side of one face of the magnet 121 and on the side of the opposing face, so that the wound coil 120 generates a propulsion force F which is opposite for each half-perimeter. These opposing propulsion forces F cannot be made to cancel each other out, and so the wound coil 120 cannot be adopted in focusing and tracking control and driving.

On the other hand, in the two-axis actuator 24 of this embodiment, as shown in FIG. 12A, by changing the winding direction of the printed coil the direction of flow of the current on the side of one face of the magnet and on the side of the opposing face can be set to be the same direction. As a result, the propulsion force can be arranged to be in the same direction on the far side of the magnet 46 and on the near side, and consequently by using two printed coil boards 43a, 43b, focusing and tracking control and driving become possible, as described above.

FIG. 13 shows another aspect of two printed coil boards. In FIG. 13, FIG. 13B shows a focusing printed coil 221a formed on the magnet side of a first printed coil board 220a, positioned on the far side of the magnet 46. FIG. 13A shows four tracking printed coils 223a, 224a, 225a, 226a, formed on the surface opposite the magnet side. These four tracking printed coils 223a to 226a are formed as four divisions, right and left, and upper and lower.

Figure 13A:
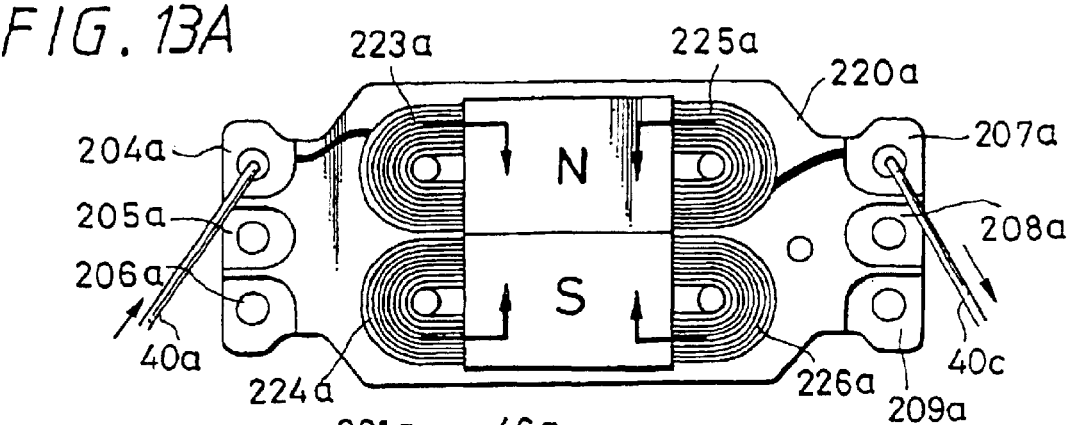
FIG. 13A is an explanatory drawing of a printed coil and magnet for focusing seen from the top side.
Figure 13B:
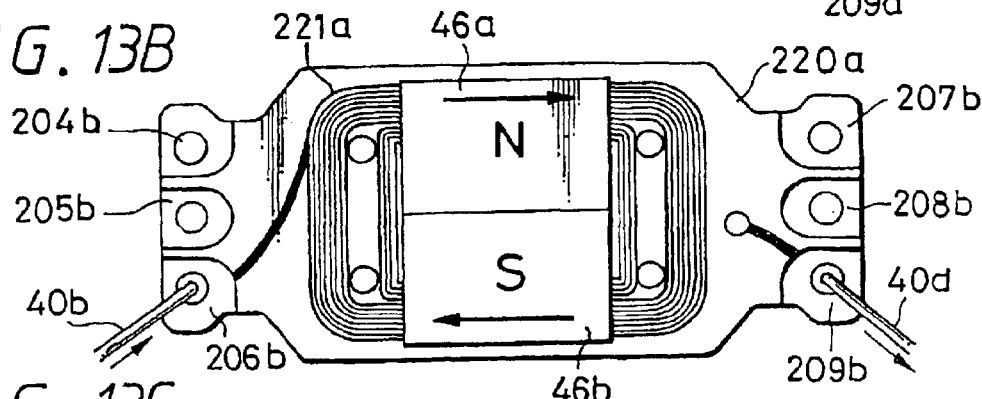
FIG. 13B is an explanatory drawing of a printed coil and magnet for focusing seen from the top side through the bottom side.
Figure 13C:
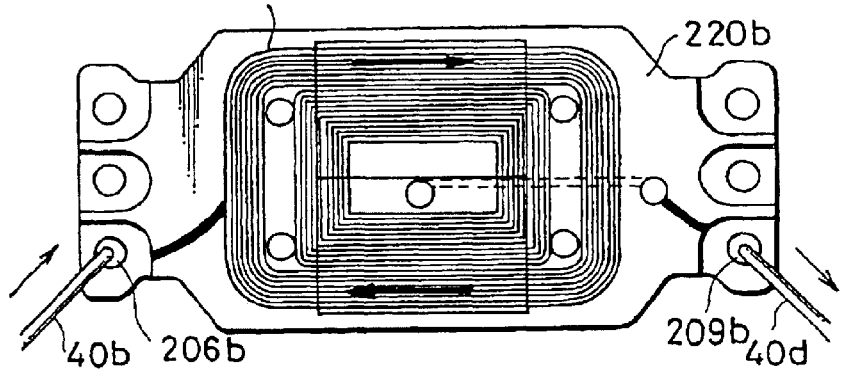
FIG. 13C is an explanatory drawing of a printed coil for focusing seen from the top side.
Figure 13D:
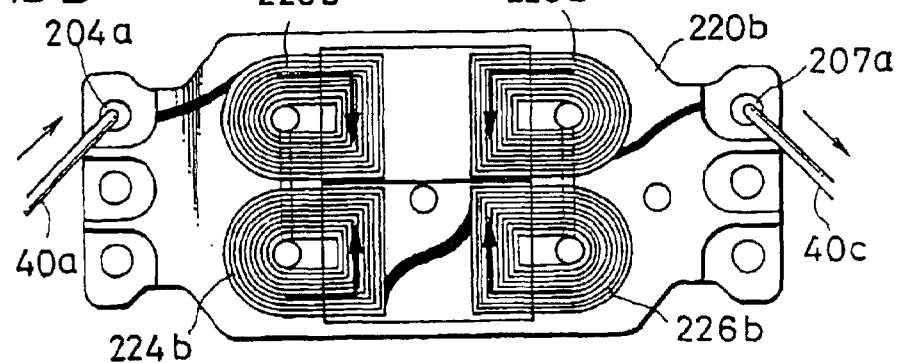
FIG. 13D is an explanatory drawing of a printed coil for tracking seen from the top side through the bottom side.

FIG. 13C shows a focusing printed coil 221b formed on the magnet side of a second printed coil board 220b, positioned on the near side of the magnet 46. And, FIG. 13D shows four tracking printed coils 223b, 224b, 225b, 226b, formed on the surface opposite the magnet. These four tracking printed coils 223b to 226b are formed as four divisions, right and left, and upper and lower. Two magnets 46a, 46b are positioned with their N and S poles set as shown in the figure relative to these printed coils.

These first and second printed coil boards 220a, 220b are similarly supported by the above-described four support wires 40a to 40d, and a driving current is supplied via these four support wires 40a to 40d. For example, the first support wire 40a is connected to the connection portion 204a at the upper left of the pair of printed coil boards 220a, 220b. The second support wire 40*b* is connected to the connection portion 206*b* at the lower left of the pair of printed coil boards 220*a*, 220*b*. The third support wire 40*c* is connected to the connection portion 207*a* at the upper right of the pair of printed coil boards 220*a*, 220*b*. And, the fourth support wire 40*d* is connected to the connection portion 209*b* at the lower right of the pair of printed coil boards 220*a*, 220*b*.

The upper-left connection portion 204*a* connected to the first support wire 40*a* is connected to the outer-periphery ends of the upper-left printed coils 223*a*, 223*b* of the tracking printed coils shown in FIGS. 13A and 13D. From here the printed coils 223*a*, 223*b* wind clockwise toward the inside to form windings. The inner-periphery ends of the printed coils 223*a*, 223*b* penetrate the printed coil boards 220*a*, 220*b* and are connected to the inner-periphery ends of the lower-left printed coils 224*a*, 224*b* on the bottom side.

These printed coils 224*a*, 224*b* are formed so as to wind counterclockwise toward the outside. The outer-periphery ends of the printed coils 224*a*, 224*b* are connected to the outer-periphery ends of the lower-right printed coils 226*a*, 226*b*. These printed coils 226*a*, 226*b* are formed so as to wind clockwise toward the inside. The inner-periphery ends of these printed coils 226*a*, 226*b* pass through the printed coil boards 220*a*, 220*b* and are connected to the inner-periphery ends of the upper-right printed coils 225*a*, 225*b* on the bottom side.

These printed coils 225*a*, 225*b* are formed so as to wind counterclockwise toward the outside. The outer-periphery ends of these printed coils 225*a*, 225*b* are connected to the upper-right connection portion 207*a* connected to the third support wire 40*c*. By this, a series circuit of printed coils 223*a* to 226*a* and a series circuit of printed coils 223*b* to 226*b*, formed respectively on the printed coil boards 220*a*, 220*b*, are provided in parallel.

And, by for example passing a current from the first support wire 40*a* toward the third support wire 40*c*, the current flows clockwise through the printed coils 223*a*, 226*a* and 223*b*, 226*b*, and flows counterclockwise through the printed coils 224*a*, 225*a* and 224*b*, 225*b*.

On the other hand, as shown in FIGS. 13A and 13D, when two magnets 46*a*, 46*b* are magnetized with N poles upward and S poles downward, a rightward propulsive force is formed on each of the printed coil boards 220*a*, 220*b*.

As shown in FIGS. 13B and 13C, the lower-left connection portion 206*b* connected to the second support wire 40*b* is connected to the outer-periphery ends of the outside printed coils 221*a*, 221*b* for focusing. From here, the printed coils 221*a*, 221*b* are formed so as to wind clockwise toward the inside.

The inner-periphery ends of the printed coils 221*a*, 221*b* pass through the printed coil boards 220*a*, 220*b* and are drawn to the outsides of the printed coils 221*a*, 221*b* on the bottom side, and are connected to the lower-right connection portion 209*b* connected to the fourth support wire 40*d*.

By this, the printed coils 221*a*, 221*b* formed on each of the printed coil boards 220*a*, 220*b* are provided in parallel. And, by for example passing a current from the second support wire 40*b* toward the fourth support wire 40*d*, the current flows clockwise through the printed coils 221*a*, 222*a*.

On the other hand, as shown in FIGS. 13B and 13C, when two magnets 46*a*, 46*b* are magnetized with N poles upward and S poles downward, an upward propulsive force is formed on the printed coil boards 220*a*, 220*b*.

Thus in a device employing two printed coil boards 220*a*, 220*b* having the above configuration, similarly to the embodiment described above, propulsive forces in the vertical and lateral directions act on the pair of printed coil boards 220*a*, 220*b* according to the current passed between the supporting wires 40*a*, 40*b* or the supporting wires 40*c*, 40*d*. And through the occurrence of these propulsive forces, the two-axis moveable portion 41 on which are provided the printed coil boards 220*a*, 220*b* and objective lens 44 is moved. AS a result, tracking and/or focusing control and driving can be performed for the light beam passing through the objective lens 44.

In such a configuration in which printed coils are connected in parallel, even when for example the printed coil boards are fabricated with multiple layers to raise the sensitivity, layers can easily be interconnected. And, in such a configuration with printed coils connected in parallel, the connection portions 205*a*, 205*b* and 208*a*, 208*b* provided in the left and right centers of the above-described printed coil boards 43*a*, 43*b*, 220*a*, 220*b* are not used, and so these connection portions need not be provided.

The above-described objective lens driving device (two-axis actuator 24) has a configuration in which a moveable portion has provided two printed coil boards 43*a*, 43*b* or 220*a*, 220*b* in parallel with a first printed coil with a first shape formed on at least one side and a second printed coil with a second shape formed on the other side, and with an objective lens 44 provided on the two printed coil boards, and a magnet is positioned between the two printed coil boards provided in parallel; by supplying a driving current to the first and second printed coils to drive the objective lens in the vertical and/or lateral directions, twice the propulsive force is applied to the two printed coil boards positioned on either side of the magnet. Consequently, although the construction is simple, control and driving of the objective lens can be performed satisfactorily.

FIGS. 17 through 21 show a second embodiment of an optical pickup device of this invention. The optical pickup device 120 of the second embodiment combines the base member 22 and cover member 23 of the above-described first embodiment to constitute a slide base 121 as a single member combining the functions of both. The optical pickup device 120 is configured from this slide base 121 and the two-axis actuator 122 and optical equipment 123 mounted thereon.

Figure 17:
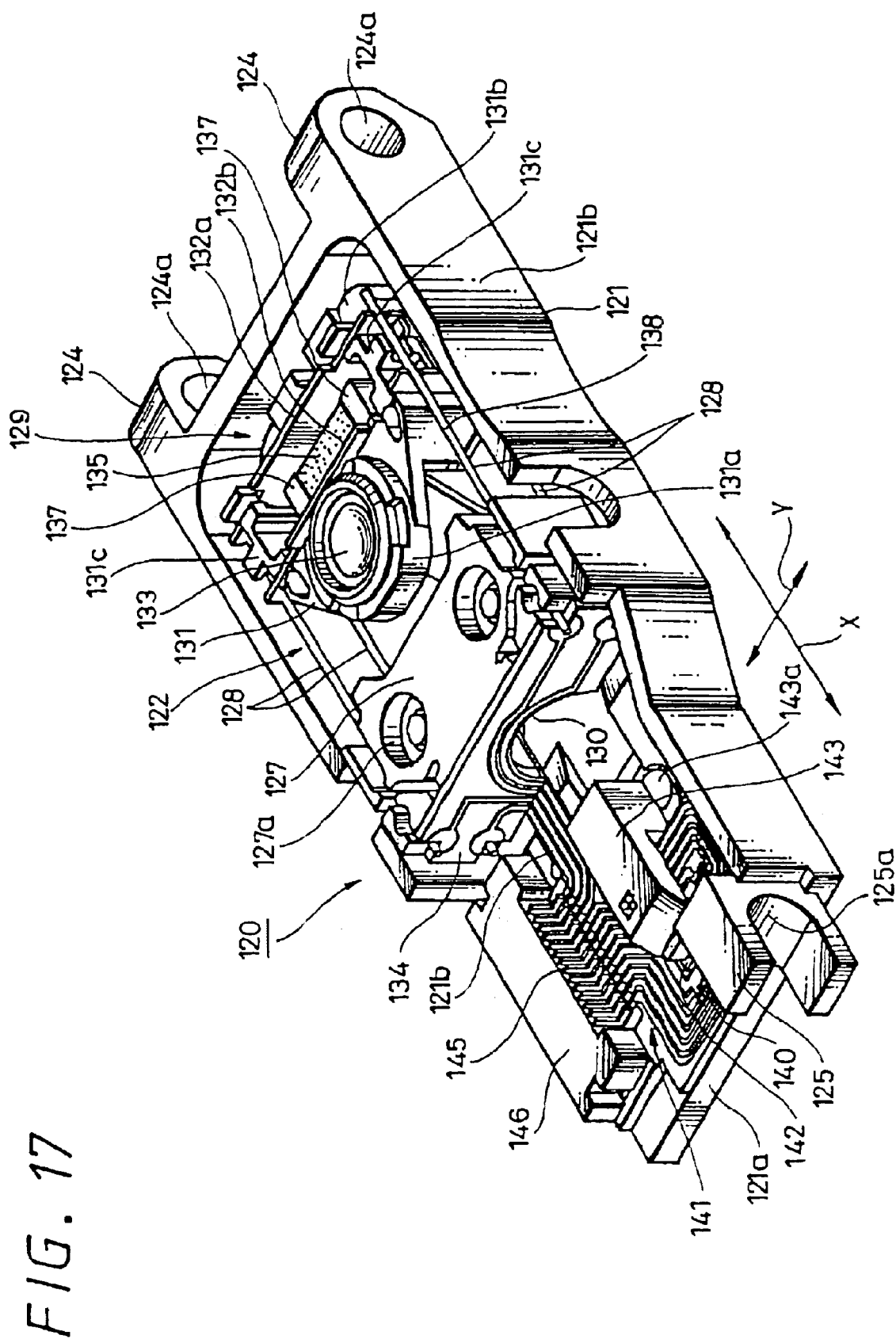
FIG. 17 is a perspective view of a second embodiment of an optical pickup device of this invention, seen from the top side.
Figure 18:
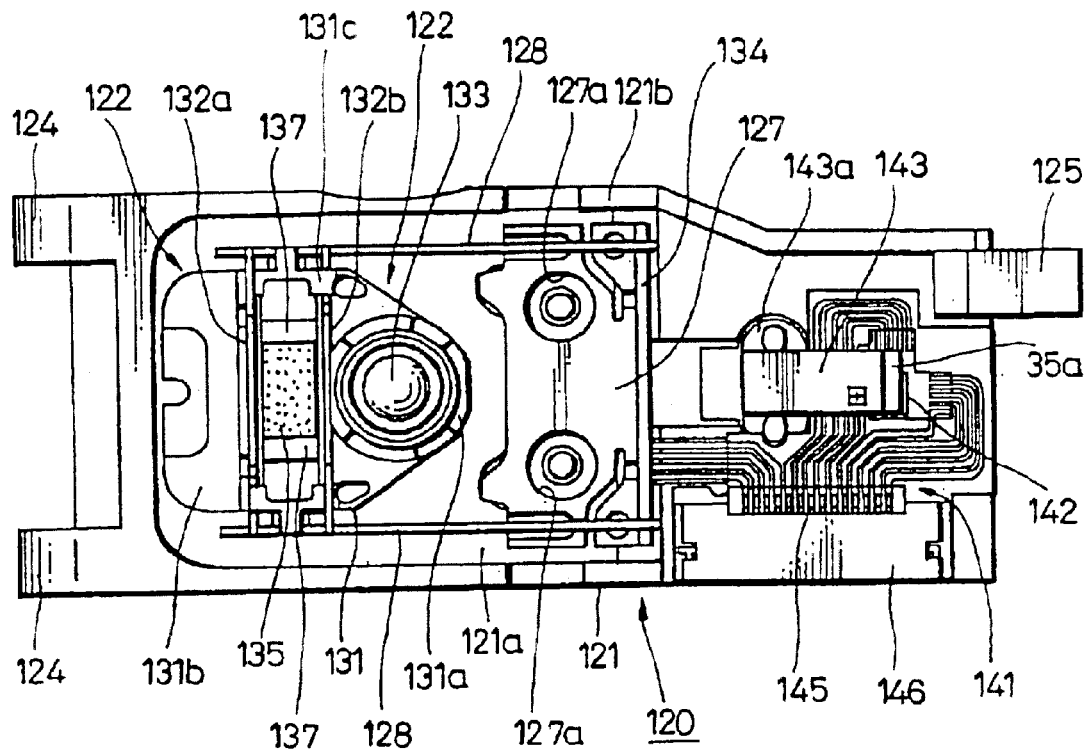
FIG. 18 is a plane view of the second embodiment of an optical pickup device of this invention.
Figure 19:
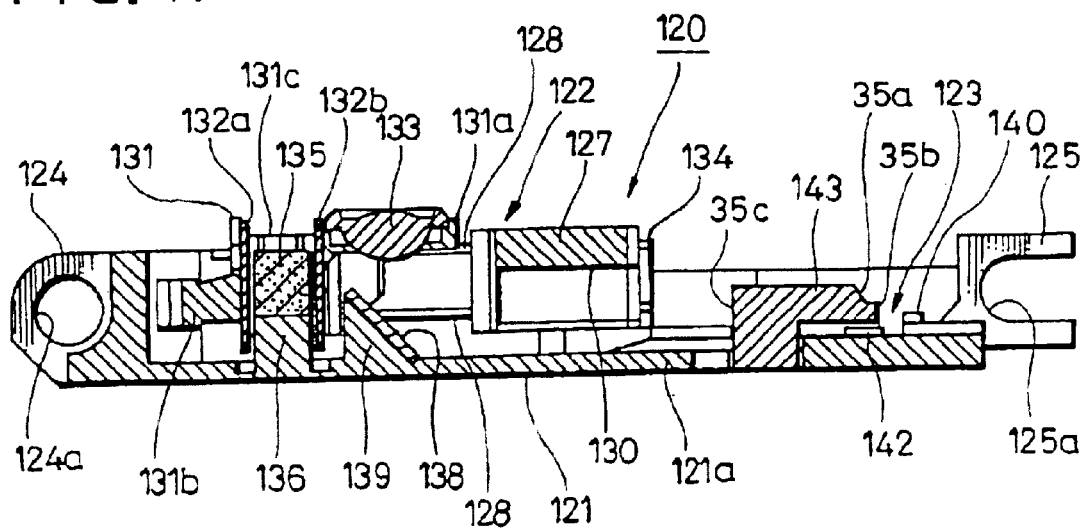
FIG. 19 is an explanatory drawing showing a cross-section along the optical system of the second embodiment of an optical pickup device of this invention.
Figure 20:
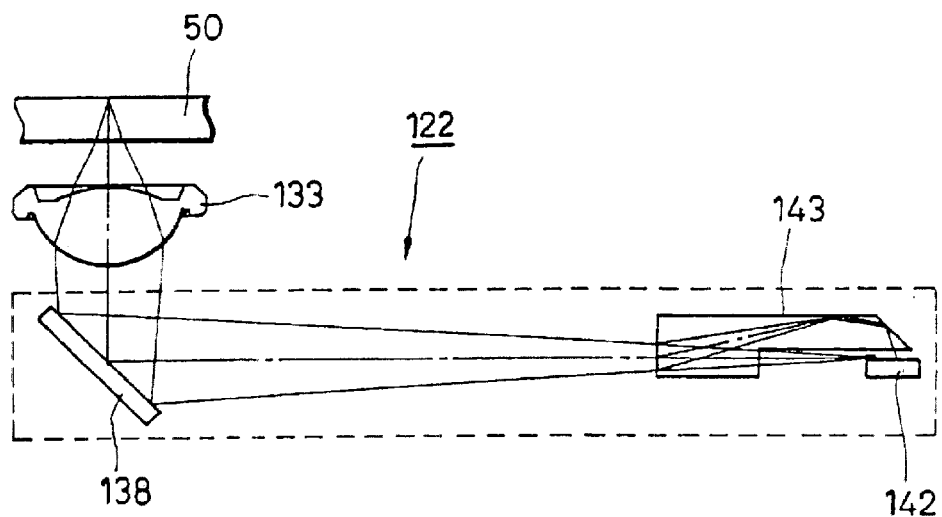
FIG. 20 is an explanatory drawing showing the optical system of the second embodiment of an optical pickup device of this invention.

As shown in FIGS. 17 to 19, the slide base 121 has a substantially rectangular base portion 121*a*, and a side face portion 121 formed by continuously lifting upward two sides in the length direction and one side in the width direction of the base portion 121*a*. This slide base 121 comprises an outer foundation formed from an insulating resin material (for example, a liquid crystal polymer), and a circuit core of a conductor, formed from an insert using the outer foundation, with necessary portions exposed to the outside and other portions buried within the outer foundation.

However, the material of the outer foundation is not limited to insulating resin materials, and metal can be used if electrically insulating; in addition, ceramics or similar may be employed.

On one side in the length direction X of the slide base 121 are provided a pair of first bearing portions 124, 124 in the width direction Y intersecting [the length direction X], across a prescribed gap. In each of these first bearing portions 124 is provided a bearing hole 124*a* with the same center, penetrating in the width direction Y. A second bearing portion 125 protruding on the side opposite the first bearing portions 124 is provided on one side in the width direction Y, on the opposite side in the length direction X, of the slide base 121. A bearing groove 125*a*, open on the outside in the length direction X, is provided in this second bearing portion 125.

At the substantial center of the slide base 121, a two-axis actuator 122 having substantially the same configuration as the above-described two-axis actuator 24 is configured integrally. The two-axis actuator 122 comprises a support member 127 fixed to the slide base 121, four support wires 128 fixed to the support member 127, and a two-axis moveable portion 129 fastened to the end portions of the four support wires 128. The support member 127 comprises a substantially rectangular block formed from an insulating material, in which are provided a plurality of screw insertion holes 127 in the length direction, with prescribed gaps therebetween. And, a tunnel portion 130 enabling passage of the light beam is provided in the lower portion of the center of the support member 127, in the length direction.

The four support wires 128 are formed of a conductive material with an appropriate elasticity, and are supported at the four corners of the support member 127 so as to be mutually parallel. The two-axis moveable portion 129 supported by the ends of these four support wires 128 comprises a lens holder 131 formed from an insulating material, and two printed coil boards 132*a*, 132*b*, fixed and supported by the lens holder 131 and forming a pair. The lens holder 131 has a holder portion 131*a*, balance portion 131*b*, and connecting wall portion 131*c*. A penetrating hole is provided in the holder portion 131*a*, and the objective lens 133 is mounted integrally so as to block this penetrating hole, using adhesive or other fastening means.

The two printed coil boards 132*a*, 132*b* are positioned so as to be parallel with a prescribed gap between, and are fixed to the lens holder 131. The ends of the four support wires 128 and the two connection wires are connected to connection portions on the two printed coil boards 132*a*, 132*b*. Also, each of the ends of the four support wires 128 is connected to a wiring pattern on the flexible printed circuit board 134.

Similarly to the above-described first embodiment, a magnet 135 is provided to intervene, separated by a prescribed gap from each of the printed coils, between the two printed coil boards 132*a*, 132*b*. And, in order to support and fix the magnet 135 in a prescribed position and at a prescribed height, a support base 136, protruding upward, is provided on the slide base 121. The magnet 135 is placed directly onto and fixed on this support base 136, and set such that each of the printed coil faces of the two printed coil boards 132*a*, 132*b* are parallel or substantially parallel to the respective opposing faces of the magnet 135.

On the support base 136 are provided a pair of clamping pieces 137, 137. By fitting the magnet 135 between these clamping pieces 137, 137 and placing the magnet on the support base 136, the magnet 135 can be positioned and fixed to the slide base 121. The magnet 135 is set such that the center substantially coincides with the combined propulsion point arising due to the printed coils of the two printed coil boards 132*a*, 132*b*.

A reflecting mirror 138 which modifies the direction of propagation of the light beam is positioned below the objective lens 133, the optical axis of which is set in the vertical direction. The reflecting mirror 138 is fixed on an inclined face of a mirror cradle 139 provided on the slide base 121, with the reflecting face set so as to make substantially a 45° angle with the horizontal plane. The center of the reflecting face of the reflecting mirror 138 is set so as to be the same or substantially the same as the center of the optical axis of the light beam emitted from the laser light source 140, positioned so as to oppose the reflecting mirror.

The laser light source 140 is mounted on and electrically connected to the electrical circuit 141 formed by the circuit core, at the end of the slide base 121 in the length direction X on the side of the second bearing portion 125. On the inside of the laser light source 140 on the electrical circuit 141, a photodetector 142 is mounted and electrically connected. As shown in FIG. 19, the laser light source 140 is set at a position a step higher than the photodetector 142; hence the light beam emitted from the laser light source 140 does not strike the photodetector 142, but propagates upward. The prism 143 and the above-described reflecting mirror 138 are positioned along the optical axis of the light beam emitted from the laser light source 140.

The wiring pattern of the above-described flexible printed circuit board 134 is electrically connected to the circuit core forming the electrical circuit 141. And as shown in FIG. 21, except for the portion on which the laser light source 140 and photodetector 142 are mounted and the necessary peripheral portions, the circuit core is covered by the outer foundation, and the laser light source 140 and photodetector 142 are exposed in the circuit exposure portion 144 of the electrical circuit.

FIG. 17 and FIG. 18 show the state in which the electrical circuit 141 of the circuit core is exposed, equivalent to an intermediate product prior to becoming the molded slide base 121. On the side face of the slide base 121, numerous terminals 145 constituting a portion of the circuit core and a connector portion 146, formed from a portion of the outer foundation, are provided integrally. The connector portion 146 is provided for connection with outside wiring, and has a non-ZIF type connector construction; however, a ZIF-type connector may also be used.

Figure 21:
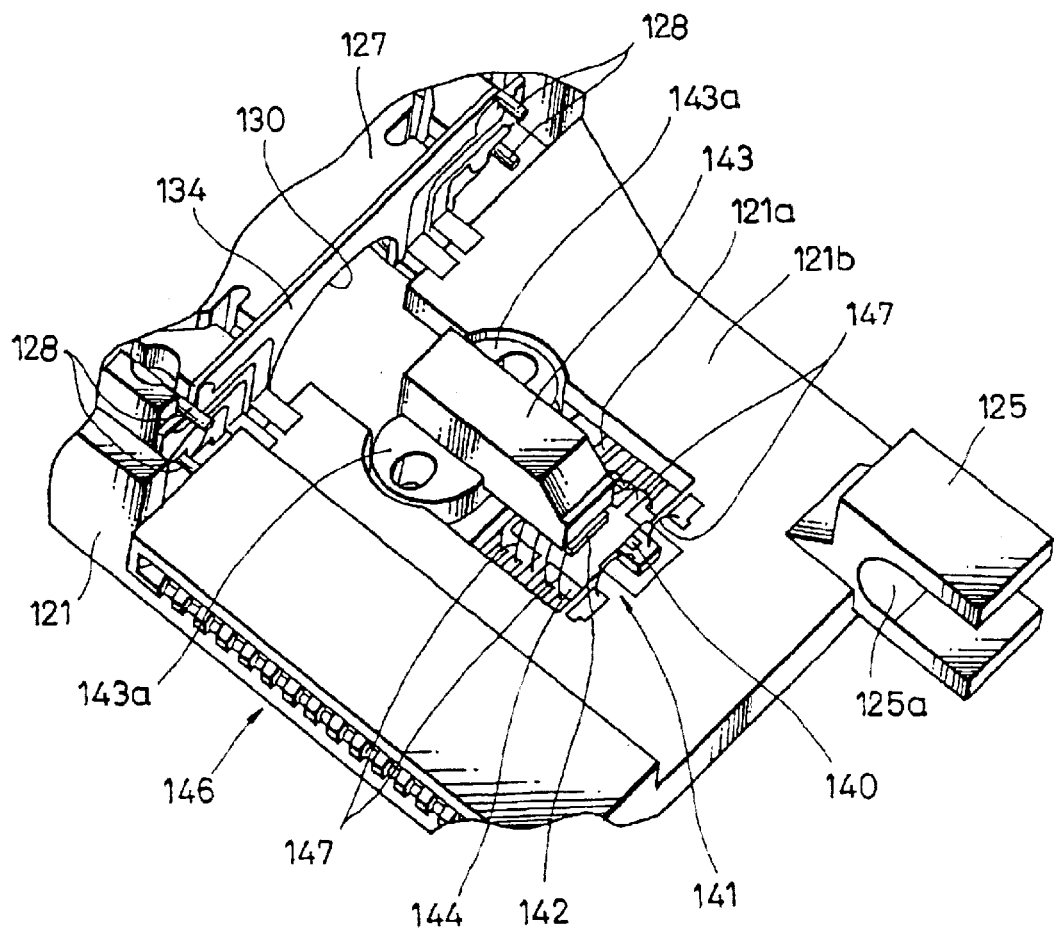
FIG. 21 is a perspective view showing the principal components of the slide base of the second embodiment of an optical pickup device of this invention; and, FIG. 22 is a perspective view showing the frame and yoke used in the objective lens driving device of a conventional optical pickup device.
Figure 22:
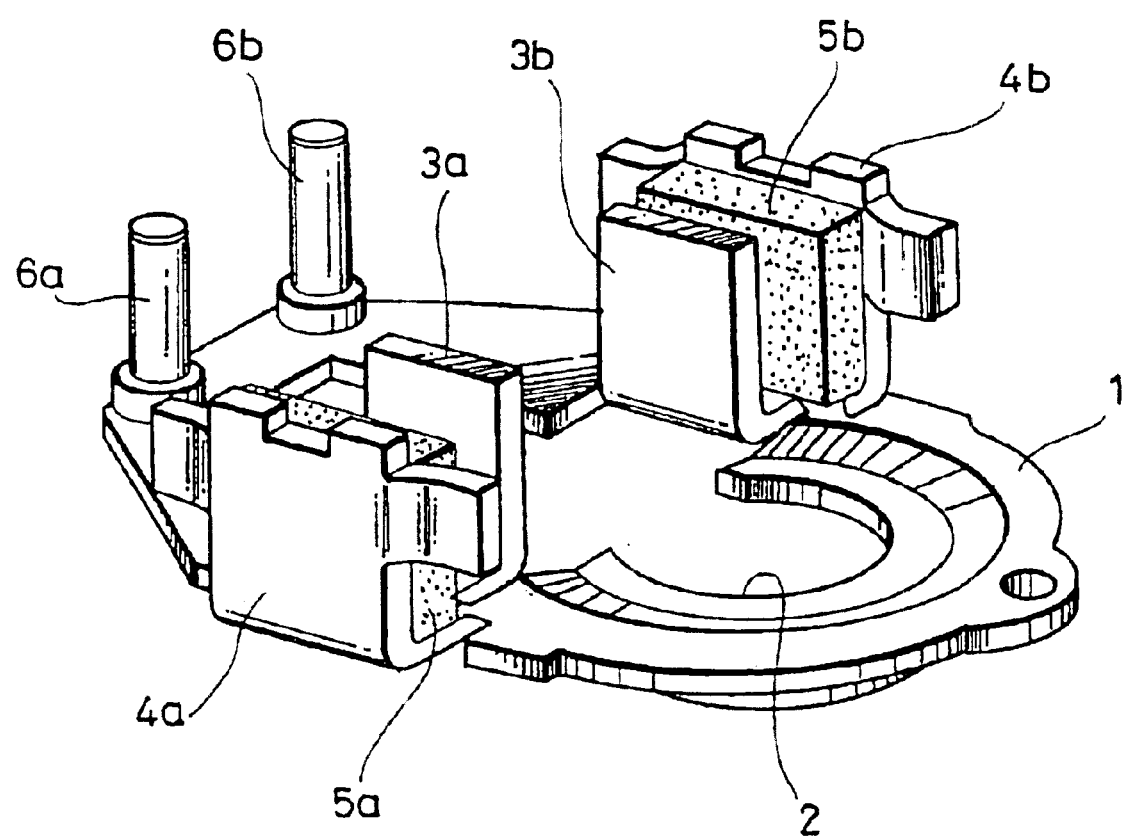

FIG. 21 shows the state in which, except for the necessary portion (circuit exposure portion 144) of the electrical circuit 141 in FIG. 17, the upper face of the circuit core is covered by the outer foundation. The laser light source 140 and photodetector 142 mounted on the circuit exposure portion 144 are electrically connected to the surrounding electrical circuit by wire bonding 147 or by other connection means. The prism 143 is positioned above the photodetector 142, and the light beam emitted from the laser light source 140 is incident on the prism 143 from the diffraction grating 35*b*. The returning light beam input to the prism 143 from the second diffraction grating 35*c* is reflected by the reflecting face 35*a* and is incident on the light-receiving portion of the photodetector 142.

The laser light source 140, photodetector 142 and prism 143 are similar to those described above in the first embodiment, and so the same symbols are assigned to the same portions, and explanations are omitted. Also, the symbol 143*a* shown in FIG. 17 is a flange portion with a hole, used to fix the prism 143 to the slide base 121. A protrusion is provided in the slide base 121 corresponding to this flange portion 143*a*; after fitting the protrusion into the hole, by solder-welding the tip of the protrusion, the prism 143 is positioned and fixed to the slide base 121.

By this optical pickup device 120 of the second embodiment also, advantageous results similar to those of the optical pickup device 20 of the above-described first embodiment are obtained. That is, the slide base 121 is formed from an insulator, and by insert molding in the interior or on the surface, an electrical circuit is formed, while also endowing the configuration with the functions of connectors having electrodes; consequently connection to a connection implement having electrodes of external wiring, and direct connection to the electrical circuit within the slide base 121, are possible. As a result, use of connectors employed in connections with FF cables and external wiring is reduced insofar as possible, the number of parts used is decreased, and assembly processes are facilitated.

In addition, the semiconductor laser 140 and photodetector 142 can be directly mounted on the slide base 121, and are connected to the electrical circuit 141 within the slide base 121 by wire bonding 147; hence the use of expensive laser couplers, hologram laser units and similar can be abolished or reduced, and high-precision assembly of optical system equipment is made possible.

The present invention is not limited to the embodiments explained above; and although, in the above embodiments, examples of application to a disc recording/reproduction device capable of both recording and reproduction of information was explained, it is of course possible to apply this invention to a disc recording device or to a disc reproduction device capable only of either recording or reproduction. Further, a two-axis actuator was employed as an objective lens driving device, and an example was explained in which a wire support method was used as a specific example; however, this invention is not thereby limited, and, for example, a leaf-spring method in which the moveable portion is supported by a leaf spring, or a hinge method in which the moveable portion is supported by a hinge mechanism, can be adopted.

In this way, the present invention can be modified variously within the range in which there is no deviation from the essence of the invention.

INDUSTRIAL APPLICABILITY

By an objective lens driving device of this application, twice the propelling force is generated through two printed coil boards positioned on either side of a magnet, so that a simple configuration can be employed for satisfactory driving and control of the objective lens.

Also, by an optical pickup device of this application, the overall device construction can be simplified and the number of parts reduced, while also enabling improved ease of assembly and enhanced assembly properties, as well as higher precision of positioning of individual components, thereby reducing the cost of the device as a whole.

And, by an optical information recording and/or reproduction device of this application, the various electronic components and electrical equipment can be fixed in place reliably, mounting means can be simplified, the device made more compact, and the number of components reduced.

What is claimed is:

1. An objective lens driving device, wherein:
   two printed coil boards are provided in parallel, with a first printed coil with a first shape formed on at least the face of one side and a second printed coil with a second shape formed on the face of the other side;
   a moveable portion, on which an objective lens is provided, is connected with said two printed coil boards, and a magnet is positioned between said two printed coil boards provided in parallel; and
   a driving current is supplied to each of said first and second printed coils to drive said objective lens in the vertical and/or lateral directions.

2. The objective lens driving device according to claim 1, wherein said first printed coil is formed divided into left and right portions, and said second printed coil is formed divided into upper and lower portions; and
   said magnet is positioned such that the magnetic flux of said magnet is perpendicular with said printed coil boards.

3. The objective lens driving device according to claim 1, wherein: six connection portions are provided on each of said two printed coil boards;
   of said connection portions, two are used to connect in series said first and second printed coils provided on said two printed coil boards using two conducting wires; and
   of said connection portions, four are used selectively to supply driving current to said first and second printed coils by means of four conductive support members, and moreover said moveable portion on which is provided the objective lens is supported by said four conductive support members.

4. The objective lens driving device according to claim 1, wherein said first printed coil is formed divided into four portions, left and right, and upper and lower, while said second printed coil is formed as a single coil; and
   said magnet is positioned such that the magnetic flux of said magnet is parallel to said printed coil boards.

5. The objective lens driving device according to claim 1, wherein four connection portions are provided on each of said two printed coil boards; and
   driving current is supplied to said first and second printed coils provided on said two printed coil boards using said four connection portions, in parallel by means of four conductive support members, and moreover said moveable portion on which is provided the objective lens is supported by means of said four conductive support members.

6. An optical pickup device, wherein:
   two printed coil boards are provided in parallel, with a first printed coil with a first shape formed on at least the face of one side and a second printed coil with a second shape formed on the face of the other side;
   a moveable portion, on which an objective lens is provided, is connected with said two printed coil boards, and
   a magnet is positioned between said two printed coil boards provided in parallel;
   at least tracking and focusing error signals are detected from the light beam passing through said objective lens; and
   driving currents based on said error signals are supplied to said first and second printed coils, to perform control and driving of said objective lens in the tracking direction, and/or focusing direction.

7. The optical pickup device according to claim 6, wherein said first printed coil is formed divided into left and right portions, and said second printed coil is formed divided into upper and lower portions; and
   said magnet is positioned such that the magnetic flux of said magnet is perpendicular to said printed coil boards.

8. The optical pickup device according to claim 6, wherein: six connection portions are provided on each of said two printed coil boards;
   of said connection portions, two are used to connect in series said first and second printed coils provided on said two printed coil boards using two conducting wires; and
   of said connection portions, four are used selectively to supply driving current to said first and second printed coils by means of four conductive support members, and moreover said moveable portion on which is provided the objective lens is supported by said four conductive support members.

9. The optical pickup device according to claim 6, wherein said first printed coil is formed divided into four portions, left and right, and upper and lower, while said second printed coil is formed as a single coil; and said magnet is positioned such that the magnetic flux of said magnet is parallel to said printed coil boards.

10. The optical pickup device according to claim 6, wherein four connection portions are provided on each of said two printed coil boards; and driving current is supplied to said first and second printed coils provided on said two printed coil boards using said four connection portions, in parallel by means of four conductive support members, and moreover said moveable portion on which is provided the objective lens is supported by means of said four conductive support members.

* * * * *